US009959703B2

(12) United States Patent
Igesund

(10) Patent No.: US 9,959,703 B2
(45) Date of Patent: May 1, 2018

(54) GAMING MACHINE WITH SYMBOL REPLACEMENT

(71) Applicant: Pridefield Limited, Douglas, Isle of Man (GB)

(72) Inventor: Terence Igesund, Kaw-Zulu Natal (ZA)

(73) Assignee: Pridefield Limited, Douglas, Isle of Man (GB)

( * ) Notice: Subject to any disclaimer, the term of this patent is extended or adjusted under 35 U.S.C. 154(b) by 89 days.

(21) Appl. No.: 15/140,945

(22) Filed: Apr. 28, 2016

(65) Prior Publication Data

US 2016/0351005 A1 Dec. 1, 2016

(30) Foreign Application Priority Data

May 29, 2015 (GB) .................................. 1509340.4

(51) Int. Cl.
*A63F 13/00* (2014.01)
*G07F 17/32* (2006.01)
*G07F 17/34* (2006.01)

(52) U.S. Cl.
CPC ........ *G07F 17/3213* (2013.01); *G07F 17/326* (2013.01); *G07F 17/3267* (2013.01); *G07F 17/34* (2013.01)

(58) Field of Classification Search
CPC ..... G07F 17/3244; G07F 17/326; G07F 17/34
See application file for complete search history.

(56) References Cited

U.S. PATENT DOCUMENTS 5,704,835 A 1/1998 Dietz, II
6,379,248 B1 4/2002 Jorasch et al.
(Continued)

FOREIGN PATENT DOCUMENTS

AU 2003246319 10/2003
AU 2013251288 5/2014
(Continued)

OTHER PUBLICATIONS

Australian Patent Office, Patent Examination Report No. 1, dated Dec. 20, 2012, issued in connection with Australian Patent Application No. 2011253848, 4 pages.
(Continued)

*Primary Examiner* — James S McClellan
(74) *Attorney, Agent, or Firm* — McDonnell Boehnen Hulbert & Berghoff LLP

(57) ABSTRACT

A gaming machine may determine that a trigger event for a bonus game occurred during a base outcome event of a base game, wherein the base game and the bonus game are both reel-based games being executed on behalf of a client machine. In response, the gaming machine may award use of two or more replaceable symbols for the bonus game. Until all of the replaceable symbols have been used, the gaming machine may repeatedly carry out iterations of bonus game operations including: determining a symbol set for display on a plurality of reels, where the symbol set includes non-replaceable symbols and zero or more replaceable symbols, and where each displayed replaceable symbol is successively replaced in the display by either a new non-replaceable symbol or a new replaceable symbol until no displayed replaceable symbols remain on the plurality of reels.

13 Claims, 24 Drawing Sheets

(56) References Cited

U.S. PATENT DOCUMENTS

| | | | |
|---|---|---|---|
| 6,439,993 B1 | 8/2002 | O'Halloran | |
| 6,712,697 B2 | 3/2004 | Acres | |
| 6,743,102 B1 | 6/2004 | Fiechter et al. | |
| 6,855,054 B2 | 2/2005 | White et al. | |
| 6,939,228 B2 | 9/2005 | Shimizu | |
| 7,063,617 B2 | 6/2006 | Brosnan et al. | |
| 7,090,580 B2 | 8/2006 | Rodgers et al. | |
| 7,237,775 B2 | 7/2007 | Thomas et al. | |
| 7,331,862 B2 | 2/2008 | Rodgers et al. | |
| 7,331,866 B2 | 2/2008 | Rodgers et al. | |
| 7,331,867 B2 | 2/2008 | Baelocher et al. | |
| 7,341,518 B2 | 3/2008 | Muskin | |
| 7,393,278 B2 | 7/2008 | Gerson et al. | |
| 7,850,521 B2 | 12/2010 | Rodgers et al. | |
| 7,857,695 B2 | 12/2010 | Rodgers et al. | |
| 7,950,994 B2 | 5/2011 | Berman et al. | |
| 8,430,743 B2 | 4/2013 | Moshal | |
| 8,734,237 B2 | 5/2014 | Moshal | |
| 9,224,270 B2 | 12/2015 | Lee et al. | |
| 9,659,456 B2 | 5/2017 | Van Linden | |
| 9,830,780 B2 | 11/2017 | Cuddy et al. | |
| 2002/0045474 A1 | 4/2002 | Singer et al. | |
| 2002/0151359 A1 | 10/2002 | Rowe | |
| 2003/0064810 A1 | 4/2003 | Okada | |
| 2003/0155715 A1 | 8/2003 | Walker et al. | |
| 2003/0162588 A1 | 8/2003 | Brosnan et al. | |
| 2004/0032086 A1 | 2/2004 | Barragan | |
| 2004/0097280 A1 | 5/2004 | Gauselmann | |
| 2004/0254011 A1 | 12/2004 | Muskin | |
| 2004/0259640 A1 | 12/2004 | Gentles et al. | |
| 2005/0010715 A1 | 1/2005 | Davies et al. | |
| 2005/0054420 A1 | 3/2005 | Cregan et al. | |
| 2005/0153778 A1 | 7/2005 | Nelson et al. | |
| 2005/0170883 A1 | 8/2005 | Muskin | |
| 2005/0239545 A1 | 10/2005 | Rowe | |
| 2006/0264254 A1 | 11/2006 | Aoki | |
| 2006/0281525 A1 | 12/2006 | Borissov | |
| 2007/0026933 A1 | 2/2007 | Tanimura | |
| 2007/0054732 A1 | 3/2007 | Baerlocher | |
| 2007/0060303 A1 | 3/2007 | Govender et al. | |
| 2007/0060314 A1 | 3/2007 | Baerlocher et al. | |
| 2007/0060317 A1 | 3/2007 | Martin | |
| 2007/0167226 A1 | 7/2007 | Kelly et al. | |
| 2007/0287529 A1 | 12/2007 | Kojima | |
| 2008/0039171 A1 | 2/2008 | Slomiany et al. | |
| 2008/0076574 A1 | 3/2008 | Okada | |
| 2008/0108411 A1 | 8/2008 | Jensen et al. | |
| 2008/0287178 A1 | 11/2008 | Berman et al. | |
| 2009/0054129 A1 | 2/2009 | Yoshimura et al. | |
| 2009/0069071 A1* | 3/2009 | Aoki | G07F 17/34 463/20 |
| 2009/0104979 A1 | 4/2009 | Ruymann | |
| 2009/0156303 A1 | 6/2009 | Kieley et al. | |
| 2009/0305769 A1 | 12/2009 | Plowman | |
| 2009/0305770 A1 | 12/2009 | Bennett et al. | |
| 2010/0004050 A1* | 1/2010 | Caputo | G07F 17/3265 463/21 |
| 2010/0022297 A1* | 1/2010 | Saunders | G07F 17/32 463/21 |
| 2010/0120525 A1 | 5/2010 | Baerlocher et al. | |
| 2011/0028202 A1 | 2/2011 | Naicker et al. | |
| 2011/0117987 A1 | 5/2011 | Aoki et al. | |
| 2012/0015713 A1 | 1/2012 | Cannon | |
| 2012/0122546 A1 | 5/2012 | Lange | |
| 2012/0122547 A1 | 5/2012 | Aoki et al. | |
| 2012/0295688 A1 | 11/2012 | Watkins et al. | |
| 2013/0023329 A1 | 1/2013 | Saunders | |
| 2013/0143635 A1* | 6/2013 | Arora | G07F 17/3265 463/20 |
| 2013/0157733 A1 | 6/2013 | Thorne et al. | |
| 2013/0184047 A1 | 7/2013 | Haykin et al. | |
| 2015/0248811 A1 | 9/2015 | Wortmann et al. | |
| 2016/0351005 A1 | 12/2016 | Igesund | |
| 2016/0351006 A1 | 12/2016 | Igesund | |

FOREIGN PATENT DOCUMENTS

| | | |
|---|---|---|
| CA | 2827968 | 3/2014 |
| CA | 2868773 | 4/2015 |
| EP | 1351180 | 10/2003 |
| EP | 2615591 | 3/2013 |
| EP | 2713347 | 4/2014 |
| EP | 2866211 | 4/2015 |
| EP | 2894612 | 7/2015 |
| EP | 2916299 | 9/2015 |
| GB | 2139390 | 11/1984 |
| GB | 2393018 | 3/2004 |
| WO | 2002/41963 | 5/2002 |
| WO | 2006/027677 | 3/2006 |

OTHER PUBLICATIONS

Canadian Paten Office, Examiner's Report dated Feb. 5, 2013, issued in connection with CA Application No. 27602112, 2 pages.

European Patent Office, Extended European Search Report dated Oct. 26, 2010, issued in connection with EP Application No. 10251152.4, 8 pages.

European Patent Office, Extended European Search Report dated Feb. 24, 2012, issued in connection with EP Application No. 11194636.4, 6 pages.

European Patent Office, Supplementary European Search Report dated Oct. 8, 2008, issued in connection with EP Application No. 05789874.4, 6 pages.

Final Office Action dated Jun. 23, 2010, issued in connection with U.S. Appl. No. 10/550,744, filed Aug. 24, 2006, 13 pages.

Final Office Action dated Sep. 28, 2009, issued in connection with U.S. Appl. No. 10/550,744, filed Aug. 24, 2006, 11 pages.

Intellectual Property Office, Combined Search Report and Abbreviated Examination Report dated Nov. 29, 2016, issued in connection with Application No. GB1509339.6, 7 pages.

Intellectual Property Office, Combined Search Report and Abbreviated Examination Report dated Nov. 29, 2016, issued in connection with Application No. GB1509340.4, 7 pages.

International Bureau, International Preliminary Report on Patentability, dated Mar. 13, 2007, issued in connection with International Application No. PCT/IB2005/002678, filed on Sep. 9, 2005, 4 pages.

International Searching Authority, International Search Report and Written Opinion dated Jan. 16, 2007, issued in connection with International Application No. PCT/IB2005/002678, filed on Sep. 9, 2005, 8 pages.

Non-Final Office Action dated Dec. 24, 2009, issued in connection with U.S. Appl. No. 10/550,744, filed Aug. 24, 2006, 12 pages.

Non-Final Office Action dated Apr. 4, 2008, issued in connection with U.S. Appl. No. 10/550,744, filed Aug. 24, 2006, 8 pages.

Notice of Allowability dated Nov. 26, 2010, issued in connection with U.S. Appl. No. 10/550,744, filed Aug. 24, 2006, 4 pages.

Australian Government, IP Australia, Examination Report No. 1 dated Mar. 29, 2017, issued in connection with Australian Patent Application No. 2016202965, 3 pages.

European Patent Office, Extended European Search Report dated Jun. 6, 2017, issued in connection with Application No. EP 17153144.5, 9 pages.

Australian Government, IP Australia, Examination Report No. 1 dated Mar. 28, 2017, issued in connection with Australian Patent Application No. 2016202966, 2 pages.

Australian Government, IP Australia, Examination Report No. 2 dated Jul. 14, 2017, issued in connection with Australian Patent Application No. 2016202966, 6 pages.

Canadian Intellectual Property Office, Office Action dated Mar. 13, 2017, issued in connection with Canadian Patent Application No. 2929218, 6 pages.

Final Office Action dated Sep. 14, 2012, issued in connection with U.S. Appl. No. 12/511,391, filed Jul. 29, 2009, 14 pages.

Wortman, Jonathan, U.S. Appl. No. 15/392,946, filed Dec. 28, 2016, 44 pages.

(56) References Cited

OTHER PUBLICATIONS

European Patent Office, European Search Report dated Jul. 27, 2016, issued in connection with EP Application No. 16171834.1, 8 pages.

European Patent Office, European Search Report dated Jun. 28, 2016, issued in connection with EP Application No. 16171832.5, 8 pages.

Canadian Intellectual Property Office, Examiner's Report dated Dec. 7, 2016, issued in connection with CA Application No. 2929222, 3 pages.

Canadian Intellectual Property Office, Examiner's Report dated Jan. 16, 2018, issued in connection with Canadian Patent Application No. 2,929,218, 8 pages.

Australian Government, IP Australia, Examination Report No. 3 dated Nov. 21, 2017, issued in connection with Australian Patent Application No. 2016202966, 4 pages.

Notice of Allowance dated Dec. 20, 2017, issued in connection with U.S. Appl. No. 15/141,010, filed Apr. 28, 2016, 8 pages.

Non-Final Office Action dated Jan. 29, 2018, issued in connection with U.S. Appl. No. 15/487,869, filed Apr. 14, 2017, 12 pages.

Australian Government, IP Australia, Examination Report No. 1 dated Oct. 14, 2017, issued in connection with Australian Patent Application No. 2017200271, 4 pages.

Canadian Intellectual Property Office, Examiner's Report dated Dec. 19, 2017, issued in connection with Canadian Patent Application No. 2,954,790, 3 pages.

United Kingdom Intellectual Property Office, Search Report dated Jun. 28, 2017, issued in connection with Great Britain Patent Application No. 1601306.2, 6 pages.

Australian Government, IP Australia, Examination Report No. 2 dated Jun. 26, 2017, issued in connection with Australian Patent Application No. 2016202965, 2 pages.

Australian Government, IP Australia, Examination Report No. 3 dated Oct. 12, 2017, issued in connection with Australian Patent Application No. 2016202965, 3 pages.

Canadian Intellectual Property Office, Examiner's Report dated Dec. 19, 2017, issued in connection with Canadian Patent Application No. 2,929,222, 6 pages.

European Patent Office, Office Action dated Aug. 23, 2017, issued in connection with EP Application No. 16171832.5, 7 pages.

* cited by examiner

GAMING MACHINE WITH SYMBOL REPLACEMENT

CROSS-REFERENCE TO RELATED APPLICATION

This application claims priority to U.K. Intellectual Property Office patent application no. 1509340.4, filed May 29, 2015, which is hereby incorporated by reference in its entirety.

BACKGROUND

Wager games come in a variety of forms, including for example a mechanical slot machine. A mechanical slot machine may include one or more reels, each of which includes a fixed pattern of symbols distributed around the circumference of the reel. When a player places a wager (e.g., by placing a coin in the machine), the player is allowed to spin the reels. Each reel then comes to rest, typically with either one of the symbols, or a space in between symbols, in alignment with a pay line. A predefined winning symbol or a predefined combination of winning symbols that are aligned with the pay line can result in the player winning the game and receiving a payout. In one example, the machine may include three reels, and the pay line may be a horizontal line disposed across a centre of each of the three reels.

In another example of a wager game, a mechanical slot machine may present symbols in a matrix arrangement, with each symbol changing during a spin of the game according to the fixed pattern of symbols on the reels. For example, the machine may have five columns and three rows of symbols, for a total of fifteen symbols. Such machines often have multiple pay lines, each being defined by a collection of positions within the matrix. For example, the machine may have three pay lines, each corresponding to one row of the matrix.

While slot machines were traditionally mechanical, modern slot machines often take the form of a video gaming machine (e.g., a dedicated gaming machine located in a casino) that includes a graphical user interface (GUI), and that may emulate a mechanical slot machine. With a video gaming machine, the GUI may display an image of one or more reels or a matrix as described above, together with animation effects to simulate a spin of the one or more reels, or a spin of the columns or rows of the matrix. A computer software program, which may reside in the video gaming machine, may randomly select one or more symbols in response to a spin, and may display the selected one or more symbols on the display.

A modern slot machine may also be played over a computer network, such as by a player using a client machine that is connected to a server machine over the computer network. In this instance, the server machine may perform the spins of the game and may send the resulting symbols to the client machine for display.

The popularity of video slot games has increased due to the incorporation of novel features, such as "wild" symbol into such video slot games. These features may assist in making winning results and provide a player with entertainment and additional opportunities to win games.

SUMMARY

Viewed from one aspect, the disclosure provides a machine including a display configured to display symbols in a wager outcome event; a processor; and a non-transitory computer-readable medium storing program instructions, that when executed by the processor, cause a set of operations to be performed, the set of operations including: determining that a trigger event for a bonus game occurred during a base outcome event of a base game, wherein the base game and the bonus game are both reel-based games being executed on behalf of a client machine, and wherein both the base game and the bonus game involve spinning a plurality of reels, each reel containing a respective plurality of symbols, to determine outcome events; in response to determining that the trigger event occurred, awarding use of two or more replaceable symbols for the bonus game; and until all of the replaceable symbols have been used, repeatedly carrying out iterations of bonus game operations comprising: (i) determining a symbol set for display on the plurality of reels, wherein the symbol set includes one or more non-replaceable symbols and zero or more replaceable symbols, wherein the symbol set represents an outcome of a bonus game spin of the plurality of reels, and wherein each displayed replaceable symbol is successively replaced in the display by either a new non-replaceable symbol or a new replaceable symbol until no displayed replaceable symbols remain on the plurality of reels, (ii) determining respective bonus payout amounts associated with the displayed replaceable symbols, and (iii) transmitting indications of the respective bonus payout amounts to the client machine.

Viewed from a second aspect, the disclosure provides a method including: determining that a trigger event for a bonus game occurred during a base outcome event of a base game, wherein the base game and the bonus game are both reel-based games being executed on behalf of a client machine, and wherein both the base game and the bonus game involve spinning a plurality of reels, each reel containing a respective plurality of symbols, to determine outcome events; in response to determining that the trigger event occurred, awarding use of two or more replaceable symbols for the bonus game; and until all of the replaceable symbols have been used, repeatedly carrying out iterations of bonus game operations comprising: (i) determining a symbol set for display on the plurality of reels, wherein the symbol set includes one or more non-replaceable symbols and zero or more replaceable symbols, wherein the symbol set represents an outcome of a bonus game spin of the plurality of reels, and wherein each displayed replaceable symbol is successively replaced in the display by either a new non-replaceable symbol or a new replaceable symbol until no displayed replaceable symbols remain on the plurality of reels, (ii) determining respective bonus payout amounts associated with the displayed replaceable symbols, and (iii) transmitting indications of the respective bonus payout amounts to the client machine.

Viewed from a third aspect, the disclosure provides a gaming system that includes: a plurality of gaming devices each including at least one display device and a plurality of input devices including (i) an acceptor of a physical item associated with a monetary value, (ii) a validator configured to identify the physical item, and (iii) a cash-out button actuatable to cause an initiation of a payout associated with a credit account; one or more gaming device processors; and one or more gaming device memory devices storing a plurality of gaming device instructions executable by the one or more gaming device processors to: determine that a trigger event for a bonus game occurred during a base outcome event of a base game, wherein the base game and the bonus game are both reel-based games being executed on behalf of a particular gaming device, and wherein both the base game and the bonus game involve spinning a plurality of reels, each reel containing a respective plurality of symbols, to determine outcome events; in response to determining that the trigger event occurred, award use of two or more replaceable symbols for the bonus game; and until all of the replaceable symbols have been used, repeatedly carry out iterations of bonus game operations comprising: (i) determining a symbol set for display on the plurality of reels, wherein the symbol set includes one or more non-replaceable symbols and zero or more replaceable symbols, wherein the symbol set represents an outcome of a bonus game spin of the plurality of reels, and wherein each displayed replaceable symbol is successively replaced in the display by either a new non-replaceable symbol or a new replaceable symbol until no displayed replaceable symbols remain on the plurality of reels, and (ii) determining respective bonus payout amounts associated with the displayed replaceable symbols, and (iii) crediting the respective bonus payout amounts to the credit account.

Viewed from a fourth aspect, the disclosure provides a machine including a display configured to display symbols in a wager outcome event; a processor; and a non-transitory computer-readable medium storing program instructions, that when executed by the processor, cause a set of operations to be performed, the set of operations including: determining that a trigger event for a bonus game occurred during a base outcome event of a base game, wherein the base game and the bonus game are both reel-based games being executed on behalf of a client machine, and wherein both the base game and the bonus game involve spinning a plurality of reels, each reel containing a respective plurality of symbols, to determine outcome events; in response to determining that the trigger event occurred, awarding, by the gaming machine, two or more bonus game spins; and until all of the bonus game spins have been used, the gaming machine repeatedly carrying out iterations of bonus game operations comprising: (i) determining a symbol set for display on the plurality of reels, wherein the symbol set includes one or more non-replaceable symbols and zero or more replaceable symbols, wherein the symbol set represents an outcome of a bonus game spin of the plurality of reels, and wherein each displayed replaceable symbol is successively replaced in the display by either a new non-replaceable symbol or a new replaceable symbol until no displayed replaceable symbols remain on the plurality of reels, (ii) determining respective bonus payout amounts associated with the displayed replaceable symbols, and (iii) transmitting indications of the respective bonus payout amounts to the client machine.

Viewed from a fifth aspect, the disclosure provides a method including: determining that a trigger event for a bonus game occurred during a base outcome event of a base game, wherein the base game and the bonus game are both reel-based games being executed on behalf of a client machine, and wherein both the base game and the bonus game involve spinning a plurality of reels, each reel containing a respective plurality of symbols, to determine outcome events; in response to determining that the trigger event occurred, awarding two or more bonus game spins; and until all of the bonus game spins have been used, repeatedly carrying out iterations of bonus game operations comprising: (i) determining a symbol set for display on the plurality of reels, wherein the symbol set includes one or more non-replaceable symbols and zero or more replaceable symbols, wherein the symbol set represents an outcome of a bonus game spin of the plurality of reels, and wherein each displayed replaceable symbol is successively replaced in the display by either a new non-replaceable symbol or a new replaceable symbol until no displayed replaceable symbols remain on the plurality of reels, (ii) determining respective bonus payout amounts associated with the displayed replaceable symbols, and (iii) transmitting indications of the respective bonus payout amounts to the client machine.

Viewed from a sixth aspect, the disclosure provides a gaming system that includes: a plurality of gaming devices each including at least one display device and a plurality of input devices including (i) an acceptor of a physical item associated with a monetary value, (ii) a validator configured to identify the physical item, and (iii) a cash-out button actuatable to cause an initiation of a payout associated with a credit account; one or more gaming device processors; and one or more gaming device memory devices storing a plurality of gaming device instructions executable by the one or more gaming device processors to: determine that a trigger event for a bonus game occurred during a base outcome event of a base game, wherein the base game and the bonus game are both reel-based games being executed on behalf of a particular gaming device, and wherein both the base game and the bonus game involve spinning a plurality of reels, each reel containing a respective plurality of symbols, to determine outcome events; in response to determining that the trigger event occurred, awarding two or more bonus game spins; and until all of the bonus game spins have been used, the gaming system repeatedly carrying out iterations of bonus game operations comprising: (i) determining a symbol set for display on the plurality of reels, wherein the symbol set includes one or more non-replaceable symbols and zero or more replaceable symbols, wherein the symbol set represents an outcome of a bonus game spin of the plurality of reels, and wherein each displayed replaceable symbol is successively replaced in the display by either a new non-replaceable symbol or a new replaceable symbol until no displayed replaceable symbols remain on the plurality of reels, (ii) determining respective bonus payout amounts associated with the displayed replaceable symbols, and (iii) crediting the respective bonus payout amounts to the credit account.

In a seventh aspect, a system may include various means for carrying out each of the operations of any of the first, second, third, fourth, fifth and/or sixth aspects.

In embodiments of the disclosure in which a computer software product is used, the product may be non-transitory and store instructions on physical media such as a DVD, or a solid state drive, or a hard drive. Alternatively, the product may be transitory and in the form of instructions provided over a connection such as a network connection which is linked to a network such as the Internet.

These aspects, as well as other embodiments, aspects, advantages, and alternatives will become apparent to those of ordinary skill in the art by reading the following detailed description, with reference where appropriate to the accompanying drawings. Further, this summary and other descriptions and figures provided herein are intended to illustrate embodiments by way of example only and, as such, that numerous variations are possible. For instance, structural elements and process steps can be rearranged, combined, distributed, eliminated, or otherwise changed, while remaining within the scope of the embodiments as claimed.

DETAILED DESCRIPTION

I. Introduction

This description describes several example embodiments including, but not limited to, example embodiments pertaining to performing aspects of an outcome event using a machine. Performing the outcome event can include playing a game. The machine can display a variety of symbols during performance of an outcome event. A symbol displayed within a symbol-display-portion of a display during an outcome event may be replaced by another symbol. The replaced and replacement symbols can be used to determine a payout amount for an outcome event in which a wager is won.

Throughout this description, the articles "a" or "an" are used to introduce elements of the example embodiments. Any reference to "a" or "an" refers to "at least one," and any reference to "the" refers to "the at least one," unless otherwise specified, or unless the context clearly dictates otherwise. The intent of using the conjunction "or" within a described list of at least two terms is to indicate any of the listed terms or any combination of the listed terms.

The use of ordinal numbers such as "first," "second," "third" and so on is to distinguish respective elements rather than to denote a particular order of those elements. For purpose of this description, the terms "multiple" and "a plurality of" refer to "two or more" or "more than one."

Further, unless context suggests otherwise, the features illustrated in each of the figures may be used in combination with one another. Thus, the figures should be generally viewed as component aspects of one or more overall embodiments, with the understanding that not all illustrated features are necessary for each embodiment.

Disclosed herein are machines and methods for carrying out aspects of outcome events that include displaying symbols, such as games, in particular, wager games. In one aspect, the machines and methods provide a feature that may enhance traditional wager games (e.g., slot machines or other reel-type games) by providing a player with additional opportunities to win the game, thereby increasing the player's interest, anticipation, and excitement in connection with the game. This may in turn benefit a casino or another entity that provides a game with this feature. Indeed, wager games are typically configured to have odds that favor the casino (sometimes referred to as the "house"). Accordingly, based on the law of averages, casinos often maximize their profits simply by getting more players to play more games. Due to the provided feature, players may be drawn in (e.g., from competing casinos that lack games with such a feature) and they may play the game often. The feature can include new data communications between a server machine and a client machine within a server-client based configuration.

II. Example Architecture

Figure 1:
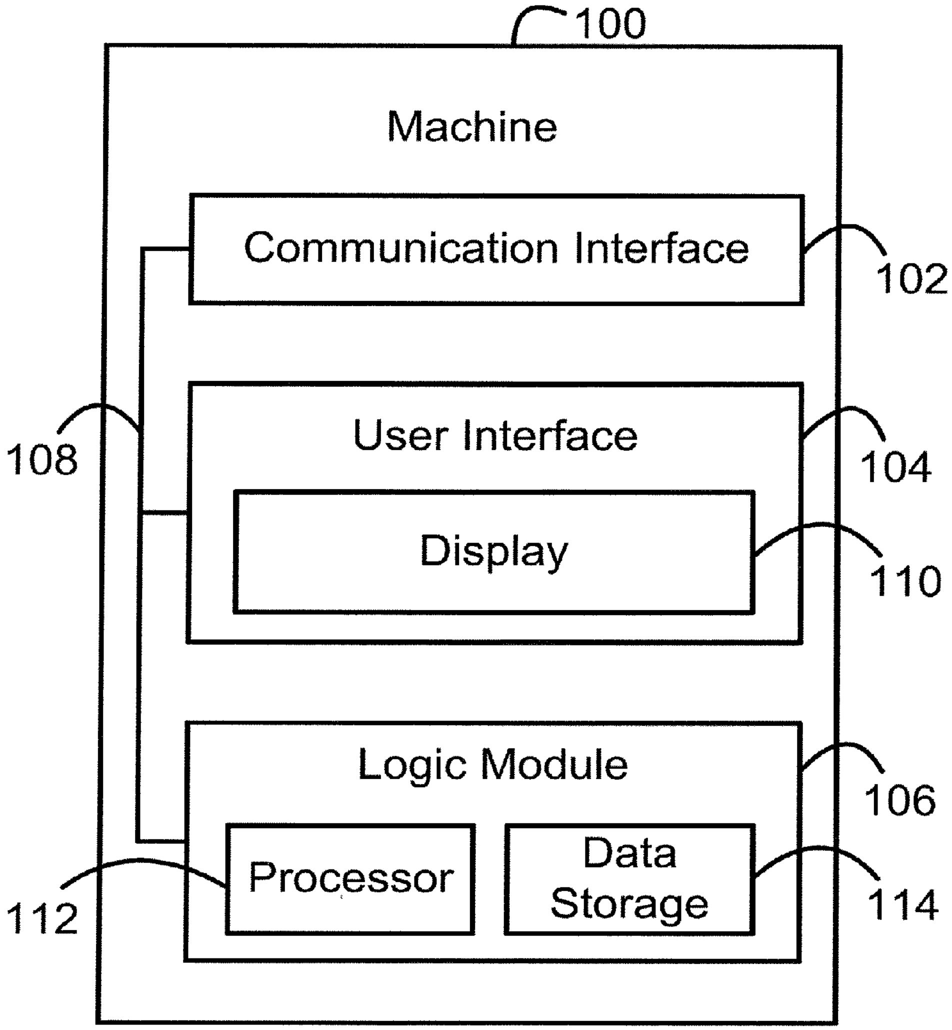
FIG. 1 is a simplified block diagram of a machine, in accordance with example embodiments.

FIG. 1 shows a simplified block diagram of an example machine 100 arranged to implement operations in accordance with example methods described herein. Machine 100 may take any of a variety of forms, including for example a dedicated gaming machine, a personal computer, a server computer, a personal digital assistant, a mobile phone, a tablet device, or some other computing device.

Machine 100 may include a communication interface 102, a user interface 104, and a logic module 106, all of which may be coupled together by a system bus, network, or other connection mechanism 108. The communication interface 102 may include a wired or wireless network communication interface. For purposes of this description, any data described as being sent or transmitted by machine 100 can be data sent by communication interface 102 over a communication network. Also, for purposes of this description, any data described as being received by machine 100 can be data sent to communication interface 102 over a communication network.

The user interface 104 may facilitate interaction with a user (e.g., a player of a game) if applicable. As such, the user interface 104 may take the form of a GUI and may include output components such as a speaker and a display 110, and input components such as a keypad or a touch-sensitive screen. As described in greater detail below, display 110 may be configured to display, among other things, a symbol set in a game or a portion thereof.

The logic module 106 can take the form of a processor 112 and a data storage 114. The processor 112 can include a general-purpose processor (e.g., a microprocessor) or a special-purpose processor (e.g., a digital signal processor or an application specific integrated circuit) and may be integrated in whole or in part with the communication interface 102 or the user interface 104. Any processor discussed in this description or shown in the drawings can be referred to as a computer-readable processor. Any data storage discussed in this description or shown in the drawings can be referred to as computer-readable data storage.

Data storage 114 may include volatile or non-volatile storage components and may be integrated in whole or in part with processor 112. Data storage 114 may take the form of a non-transitory computer-readable medium and may include software program instructions, that when executed by processor 112, cause machine 100 to perform one or more of the operations described herein. Any software program instructions discussed in this description or shown in the drawings can be referred to as computer-readable program instructions, or more simply, program instructions.

Data storage 114 may also include operating system software on which machine 100 may operate. For example, machine 100 may operate on a Windows®-based operating system (e.g., Windows XP or Windows 7) provided by the Microsoft® Corporation of Redmond, Wash. Other examples of operating systems are possible.

Figure 2:
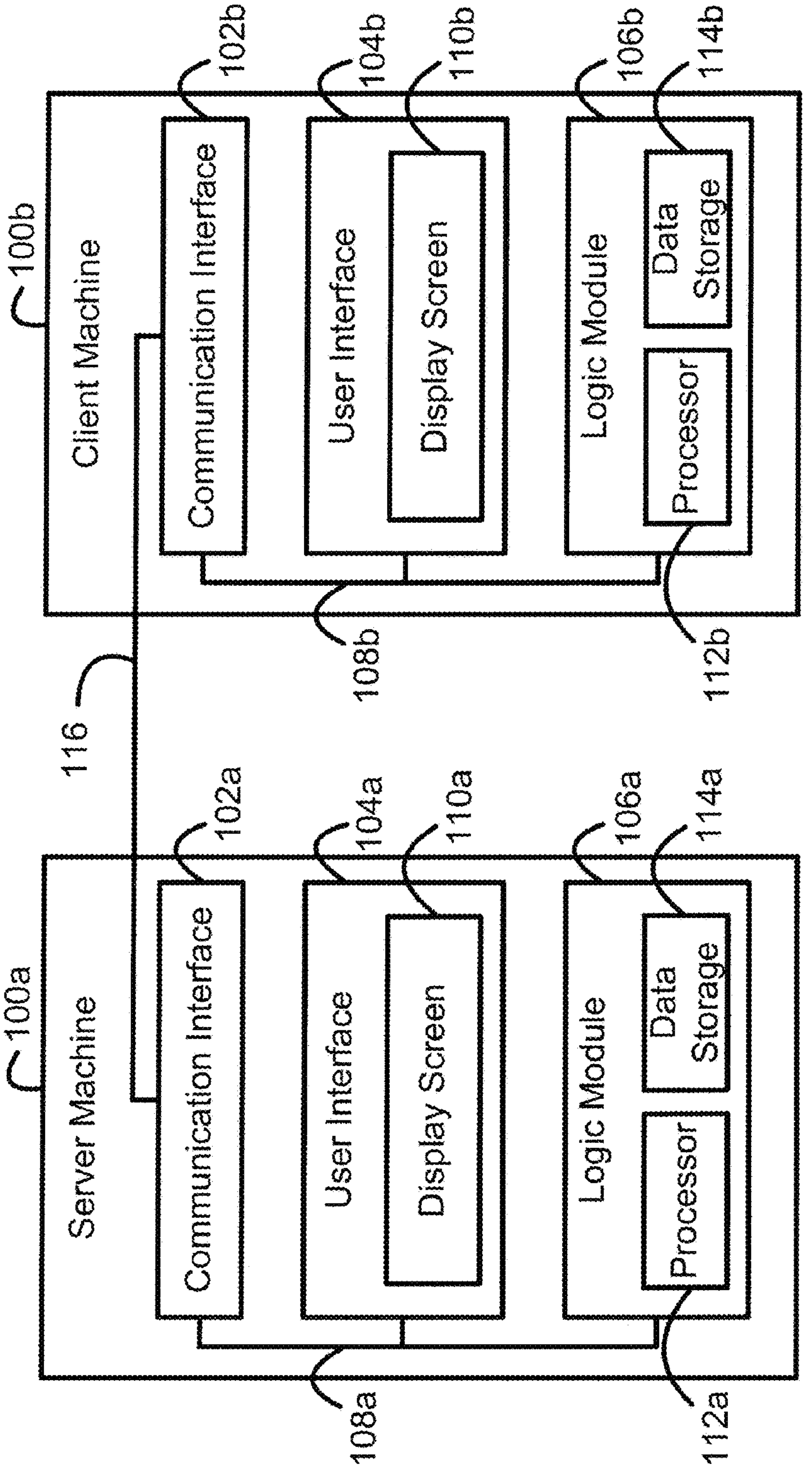
FIG. 2 is a simplified block diagram of an example server machine connected to an example client machine over a computer network, in accordance with example embodiments.

FIG. 2 is a simplified block diagram of an example server machine 100*a* connected to an example client machine (sometimes referred to as a workstation) 100*b* over a computer-network 116. A configuration of elements including server machine 100*a* and client machine 100*b* can be referred to as a server-client based configuration.

The components of the server machine 100*a* and the client machine 100*b* are shown with corresponding "a" and "b" reference numerals (i.e., based on machine 100). Server machine 100*a* includes communication interface 102*a*, user interface 104*a* (which incorporates display screen 110*a*), logic module 106*a* (which incorporates processor 112*a* and data storage 114*a*), and communication bus 108*a*. Likewise, client machine 100*b* includes communication interface 102*b*, user interface 104*b* (which incorporates display screen 110*b*), logic module 106*b* (which incorporates processor 112*b* and data storage 114*b*), and communication bus 108*b*.

The server machine 100*a* is configured to communicate with the client machine 100*b* over the computer-network 116 (via the communication interfaces 102*a*, 102*b*). Likewise, the client machine 100*b* is configured to communicate with the server machine 100*a* over the computer-network 116. For purposes of this description, any data described as being sent or transmitted by the server machine 100*a* can be data sent by communication interface 102*a* over communication network 116. Similarly, any data described as being sent or transmitted by the client machine 100*b* can be data sent by communication interface 102*b* over communication network 116. Furthermore, for purposes of this description, any data described as being received by the server machine 100*a* can be data the server machine 100*a* receives from the communication network 116 using communication interface 102*a*. Similarly, any data described as being received by the client machine 100*b* can be data the client machine 100*b* receives from the communication network 116 using communication interface 102*b*.

The computer-network 116 for the server-client based configuration described above may take a variety of forms. For example, the computer-network 116 may be a local area network (LAN) in a casino, such that client machines 100*b* dispersed throughout the casino may communicate with the server machine 100*a* in the casino.

In another example, the computer-network 116 may be a wide-area network (WAN), such as an Internet network or a network of the World Wide Web. In such a configuration, the client machine 100*b* may communicate with the server machine 100*a* via a website portal (for a virtual casino) hosted on the server machine 100*a*. The data described herein as being transmitted by server machine 100*a* to client machine 100*b* or by client machine 100*b* to server machine 100*a* can be transmitted as datagrams according to the user datagram protocol (UDP), the transmission control protocol (TCP), or another protocol.

The computer-network 116 may include any of a variety of network topologies and network devices, and may employ traditional network-related technologies, including for example the public switched telephone network, cable networks, cellular wireless networks, WiFi, and WiMAX. Further, the computer-network 116 may include one or more databases (e.g., a player credit account database), to allow for the storing and retrieving of data related to performing an outcome event by a machine, as well as adjusting account balances associated with client machines.

For purposes of this description, any operation listed in a sentence including the words the "machine 100 can cause," the "server machine 100*a* can cause," or the "client machine 100*b* can cause" can be carried out, at least in part, as a result of that particular machine executing software program instructions. Those software program instructions can be stored within data storage 114, 114*a*, or 114*b*.

Figure 5:
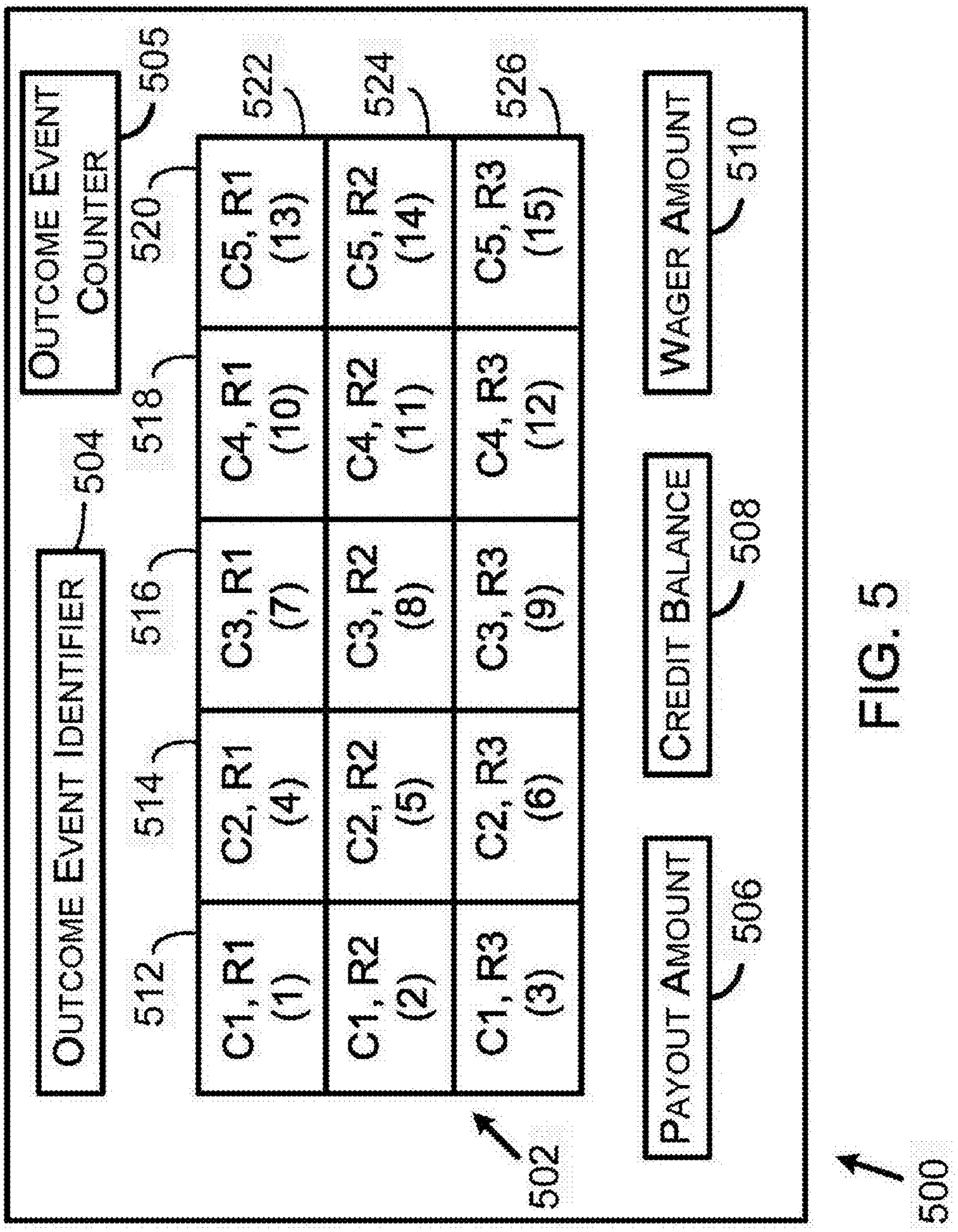
FIG. 5 depicts elements displayable by a display of a machine, in accordance with example embodiments.

Next, FIG. 5 depicts a screenshot 500 that machine 100, server machine 100*a*, or client machine 100*b* can visually present (i.e., display) using displays 110, 110*a*, and 110*b*, respectively. For purposes of this description, each element of screenshot 500 can be a displayable element of the display. Screenshot 500 includes a symbol-display-portion 502, an outcome event identifier 504, an outcome event counter 505, a payout amount indicator 506, a credit balance indicator 508, and a wager amount indicator 510.

Symbol-display-portion 502 can include multiple symbol-display-segments and multiple symbol positions. As an example, the symbol-display-segments can include vertical symbol-display-segments 512, 514, 516, 518, and 520 (or more simply, vertical SDS 512-520). As another example, the symbol-display-segments can include horizontal symbol-display-segments 522, 524, and 526 (or more simply, horizontal SDS 522-526). Each symbol-display-segment can include multiple symbol positions. The vertical SDS 512-520 are shown in FIG. 5 as having three symbol positions. The horizontal SDS 522-526 are shown in FIG. 5 as having five symbol positions. A person skilled in the art will understand that those symbol-display-segments can be configured with different numbers of symbol positions than shown in FIG. 5.

The vertical SDS 512-520 can be configured as spinnable reels. The processor of a machine or system displaying screenshot 500 can display the spinnable reels spinning and stopped after spinning. For vertical SDS 512-520, the spinnable reels may spin in a vertical direction (e.g., top to bottom or bottom to top, with respect to the symbol-display-portion 502).

The horizontal SDS 522-526 can be configured as spinnable reels. The processor of a machine or system displaying screenshot 500 can display the spinnable reels spinning and stopped after spinning. For horizontal SDS 522-526, the spinnable reels may spin in a horizontal direction (e.g., left to right or right to left, with respect to the symbol-display-portion 502).

Figure 7:
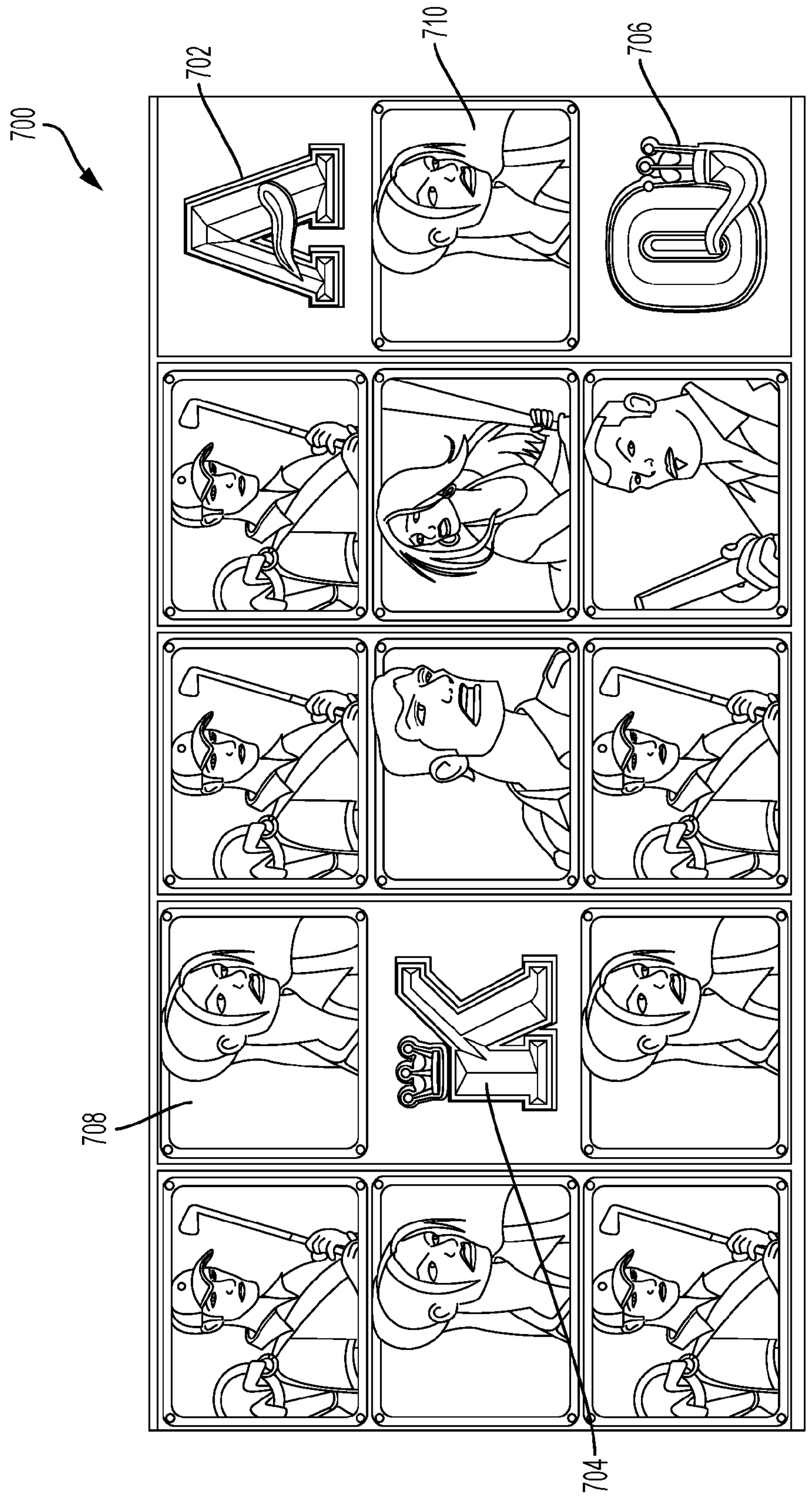
FIG. 7 depicts an example of another selected symbol set in a display, in accordance with example embodiments.

The multiple symbol positions in symbol-display-portion 502 are identified by column and row designators, in which C1=column 1, C2=column 2, C3=column 3, C4=column 4, C5=column 5, R1=row 1, R2=row 2, and R3=row 3. The multiple symbol positions in symbol-display-portion 502 are also identified by distinct numerical identifiers shown within parenthesis. C1 can be a first SDS. C2 can be a second SDS. C3 can be a third SDS. C4 can be a fourth SDS. C5 can be a fifth SDS. As shown in FIG. 7, C2 is between C1 and C3, C3 is between C2 and C4, and C4 is between C3 and C5.

For a matrix arrangement with 15 symbol positions as shown in FIG. 5, the numerical identifiers can be whole numbers 1 through 15, inclusive. The processors or machines described herein can be configured to select a symbol position of symbol-display-portion 502 using a random number generator that is configured to generate a number within the range 1 through N, inclusive, where N equals the number of symbol positions in symbol-display-portion 502. For the matrix arrangement, each symbol-display-segment can be a distinct column of the multiple columns within the matrix. Alternatively, for the matrix arrangement, each symbol-display-segment can be a distinct row of the multiple rows within the matrix.

The processor of the machines or systems described herein can determine a state the machine or system is operating in or an outcome event that can occur during the determined state of the machine or system. In response to making that determination, the processor can cause the outcome event identifier 504 to display an identifier of the outcome event that can occur during the determined state. For example, the outcome event identifier can identify a base outcome event, a bonus outcome event or another type of outcome event. The bonus outcome event can be a "free spins" outcome event or some other outcome event.

The processor of the machines or systems described herein can determine a wager amount placed on an outcome event, a payout amount after or during occurrence of an outcome event resulting in a win, a credit balance after or while decreasing a number of credits based on placement of a wager or after or while increasing a number of credits based on a determined payout amount, and a number of awarded remaining outcome events that can occur. The processor can cause the determined wager amount to be displayed by the wager amount indicator 510, the determined payout amount to be displayed by the payout amount indicator 506, the determined credit balance to be displayed by the credit balance indicator 508, and the number of awarded remaining outcome events to be displayed by the outcome event counter 505.

III. Example Operations

FIG. 3A, FIG. 3B, FIG. 3C and FIG. 3D (i.e., FIG. 3A-3D) depict a flowchart showing a set of operations 345 (or more simply, "the set 345") that can, for example, be carried out using machine 100. Nonetheless, some or all of these operations may be carried out on server machine 100*a* and/or client machine 100*b*.

The operations of the set 345 are shown within blocks labeled with even integers between 300 and 344, inclusive, and can pertain to a method in connection with machine 100. The example method can relate to performing outcome events, such as a wager game. Any other operation(s) described herein as being performed by machine 100 can be performed prior to, while, or after performing any one or more of the operations of the set 345, unless context clearly dictates otherwise. Those other operation(s) can be performed in combination with or separately from any one or more of the operations of the set 345. Any operation described below, or elsewhere in this description, with respect to FIG. 3A, FIG. 3B, FIG. 3C or FIG. 3D, can be performed, at least in part, by a processor, such as processor 112 executing software program instructions.

Figure 3A:
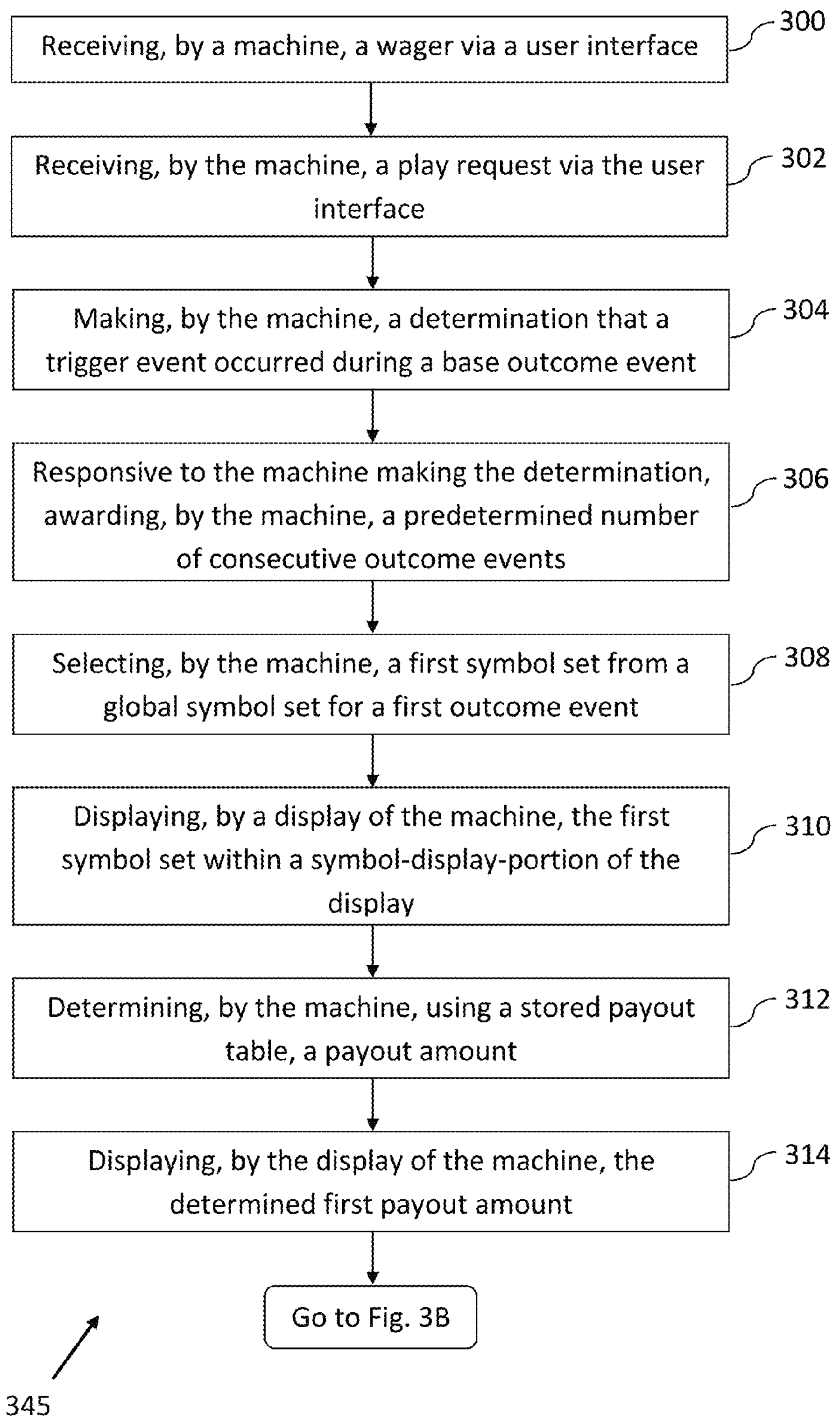
FIG. 3A is a first part of a flow chart, in accordance with example embodiments.

Turning to FIG. 3A, block 300 includes receiving, by machine 100, a wager via the user interface 104. In one example, this may allow a player to enter a wager (e.g., a wager amount) using a keypad of the user interface 104. The wager can be placed on an outcome event, such as, but not limited to, a base outcome event configured as a wager game. The received wager may or may not provide a user of the machine with an opportunity to earn (e.g., win) a payout. Since a received wager does not necessarily provide an opportunity to earn a payout, the received wager can be referred to as a payment. A base outcome event can be carried out after or in response to receiving a payment. Machine 100 can be configured such that a bonus outcome event can be carried out without receiving any additional payment after receiving a payment to carry out a base outcome event that results in an award of a predetermined number of bonus outcome events.

A player using machine 100 may have a corresponding player credit balance from which the entered wager may be deducted in response to the wager being entered or machine 100 receiving a play request from the player. For example, a player may have a player credit balance of 100,000 credits, which may be reduced to 99,750 credits upon the player requesting a play of the game with a wager of 250 credits. Additionally, or alternatively, the wager can be received by entry of a token, coin, or paper bill into the user interface 104 or by sliding or inserting a payment card, such as a credit or debit card, into the user interface 104. Machine 100 can cause display 110 to display wager information such as, but not limited to, a player credit balance on the credit balance indicator 508, possible wager amounts in wager amount indicator 510, and a received wager amount in wager amount indicator 510.

Next, block 302 includes receiving, by machine 100, a play request (e.g., a "spin" request) via the user interface 104. Receiving the play request can include or allow a player to pull a lever or push a button on machine 100 to initiate occurrence of an outcome event or to request a play of the wager game. Receiving the play request can result in the player's credit balance being reduced by an amount of the player's wager or a payment to carry out the outcome event.

Next, block 304 includes making, by machine 100, a determination that a trigger event occurred. The trigger event can be a randomly occurring event, such an event that randomly occurs during performance of at least some base outcome events. For example, occurrence of the trigger event can include machine 100 selecting, using a random process, a trigger symbol from a group of symbols, such as in connection with a previous play of the game (e.g., a base outcome event). In another example, occurrence of the trigger event can include machine 100 selecting a trigger symbol for display in a particular arrangement position (e.g., in a middle row or a middle column). As yet another example, the trigger event can include machine 100 selecting, using a random number generator, a number in response to machine 100 receiving the play request, where the selected number is a trigger number. As still yet another example, the trigger event can include machine 100 displaying a particular combination of symbols selected from a global symbol set. Note that while a few example trigger events have been described above, any of a variety of other trigger events could be used to suit a desired configuration.

Making the determination that the trigger event occurred can occur while machine 100 operates in a first machine state (or more simply, the first state). Machine 100 can be configured such that, while machine 100 is operating in the first state, machine 100 allows the player to play base outcome events in which sets of symbols selected from a global symbol set can be selected by processor 112 and displayed by display 110.

Next, block 306 includes, responsive to machine 100 making the determination (i.e., the determination made at block 304), awarding, by machine 100, a predetermined number of consecutive plays (e.g., spins and/or patterns of symbols being displayed) of outcome events. The awarded outcome events can be bonus outcome events, such as a game or a wager game. The predetermined number of consecutive outcome events can be conditioned upon a combination of symbols displayed by display 110 as a result of playing a base outcome event. Machine 100 can cause outcome event identifier 504 to identify the bonus outcome event awarded (e.g., a "free spins" bonus) and to cause the outcome event counter 505 to display the predetermined number.

Furthermore, in response to making the determination at block 304, machine 100 can transition from operating in the first state to operating in a second machine state (or more simply, the second state). Machine 100 can be configured such that, while machine 100 is operating in the second state, machine 100 allows the player to play bonus outcome events in which sets of symbols selected from a global symbol set can be selected by processor 112 and displayed by display 110. In accordance with an embodiment in which the symbol-display-portion includes 15 symbol positions, selecting a set of symbols for a bonus outcome event can include selecting 15 symbols.

Machine 100 can be configured to transition from operating in the second state back to operating in the first state. This transition can occur in response to machine 100 determining any of a variety of trigger events, such as, but not limited to, occurrence of all of the awarded predetermined number of consecutive plays of the outcome event, or a player stopping play of machine 100 while one or more of the awarded predetermined number of consecutive plays of the outcome event remain to occur. Machine 100 can be configured to store a number indicating any remaining consecutive plays of the outcome event and to allow a player awarded the consecutive plays to commence playing any remaining consecutive plays of the outcome event at a time after the player stops performing (e.g., playing) the outcome events.

Next, block 308 includes determining, by machine 100, a first symbol set to display within the symbol-display-portion 502 of display 110 for a first outcome event. The first outcome event can be an earliest occurring outcome event of a predetermined number of awarded outcome events or any subsequent outcome event of those awarded outcome events. Determining the first symbol set can include processor 112 carrying out a random selection, such as a random selection of the first symbol set from the global symbol group.

Figure 6:
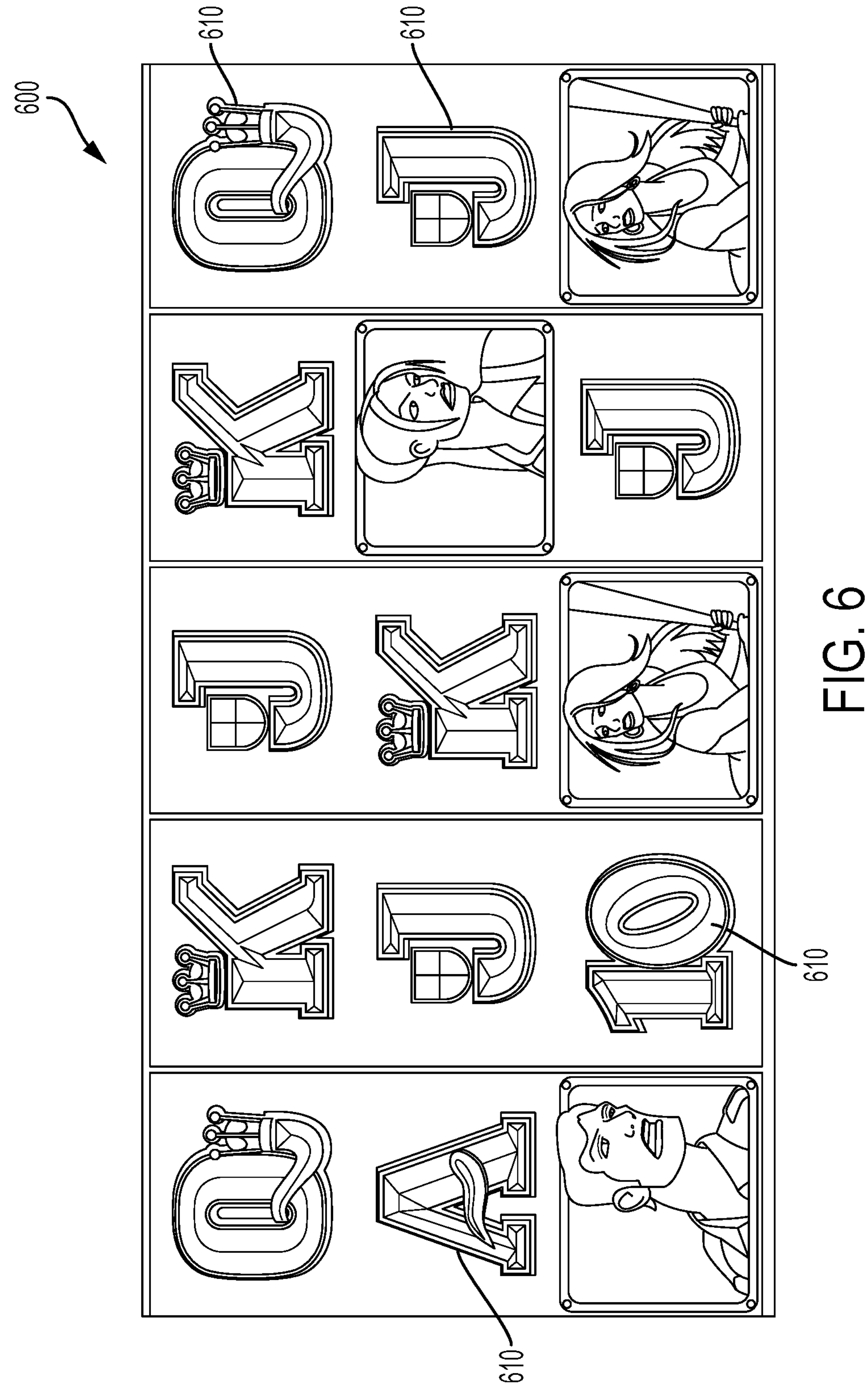
FIG. 6 depicts an example of a selected symbol set in a display, in accordance with example embodiments.

The global symbol group can include multiple symbols, such as different Portrait symbols, a wild, an Ace, a King, a Queen, a Jack and a Ten that may be used in connection with the outcome event, such as a wager game. The Ace, King, Queen, Jack and Ten symbols can represent symbols found on a standard deck of playing cards. FIG. 6 depicts examples of the aforementioned symbols and examples of other symbols that can be a part of the global symbol group. The global symbol group may be customized with particular symbols as desired.

Figure 4:
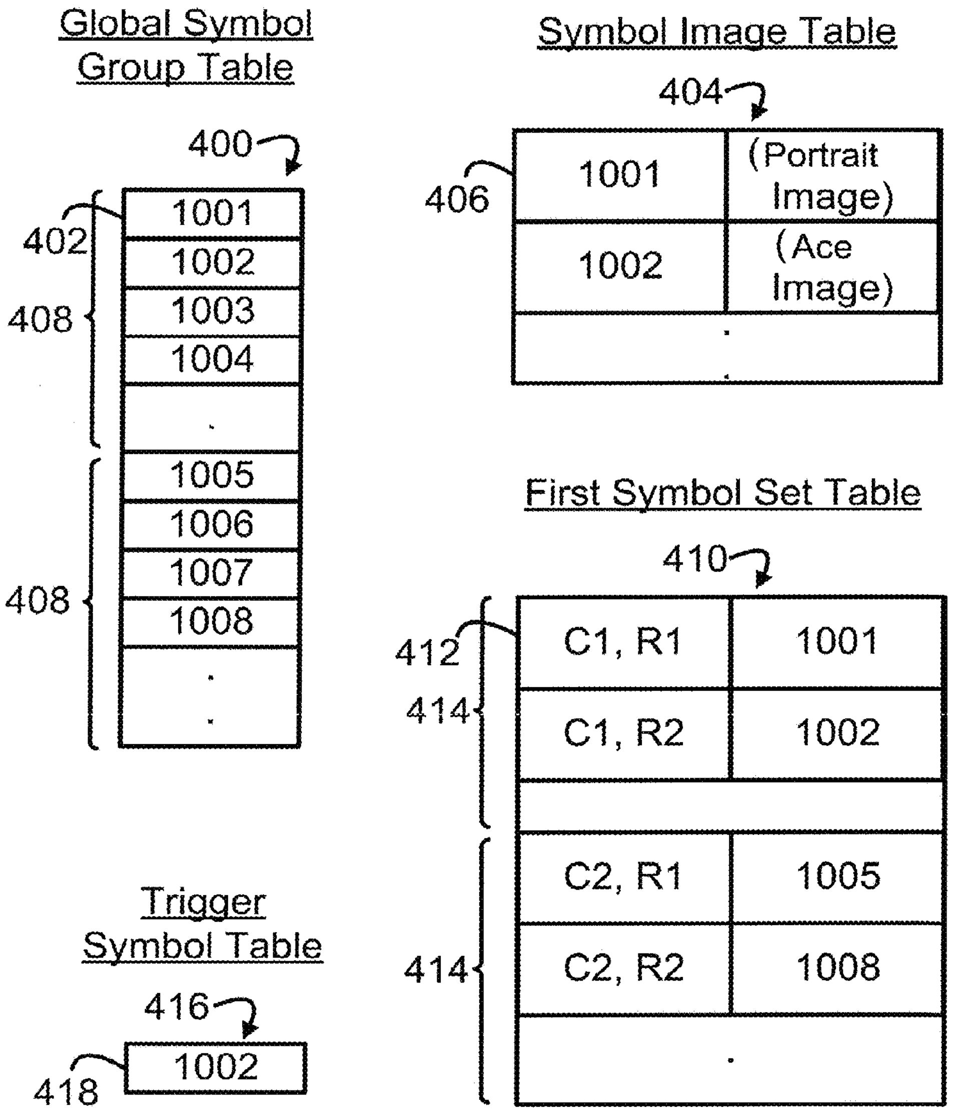
FIG. 4 depicts diagrams of tables that may be used with the processes, machines, and systems herein, in accordance with example embodiments.

In one example, the global symbol group may be represented as a table (or other data structure) stored in data storage 114. FIG. 4 shows an example global symbol group table 400. The global symbol group table 400 includes multiple records 402, each including an identifier (e.g., 1001, 1002, 1003 1004, etc.) that represents a particular symbol. In one example, the global symbol group, and therefore the global symbol table 400, may be divided into multiple sub-groups 408 as discussed in greater detail below.

The global symbol group table 400 may be used in connection with a symbol image table 404. The symbol image table 404 includes multiple records 406 (shown as distinct rows of table 404), each including an identifier that represents a particular symbol, and a corresponding displayable image. As such, the symbol image table 404 may be used to map an identifier in the global symbol group table 400 to a displayable image.

The selected first symbol set may be represented by a first symbol set table 410. The first symbol set table 410 includes multiple records 412 (shown as distinct rows in table 410), each record including an arrangement position of the symbol, and an identifier that represents the symbol. As such, each symbol in the selected first symbol set may correspond with a respective arrangement position in an arrangement (e.g. both a column number and a row number in a column-and-row arrangement). As an example, C1, R1, shown in the first symbol set table 410, represents a symbol position at column 1 (e.g., a left-most column of a plurality of columns in a symbol-display-portion 502 of display 110) and row 1 (e.g., a top row of a plurality of rows in a symbol-display-portion 502 of display 110). The column identifiers in table 410 (e.g., C1 and C2) can refer to columns in a symbol matrix or reels of a plurality of reels that can be spun.

In one example, machine 100 may select the first symbol set by iterating through each record 412 in the first symbol set table 410, and selecting a symbol identifier from among the symbol identifiers in the global symbol group table 400. In one example the symbol identifiers are numbers and machine 100 uses a random number generator to select such numbers, and therefore to randomly select symbols.

In one example, machine 100 may select each subset in the first symbol set from the corresponding sub-group in the global symbol group. This type of selection may be used when the symbol set represents one or more reels in a reel-type wager game. In this instance, each sub-group includes all the symbols of a given reel, and the selected sub-set includes the symbols of the reel that are "in play", namely those included in the selected first symbol set.

In one example, the first symbol set may be partially restricted. For instance, the first symbol set may include an instance of a predetermined symbol from the global symbol group, for example, a wild symbol. In another example, the predetermined symbol may be in a subgroup of global symbol group table 400 distinct from the subgroups from which symbols for the reels are selected.

As noted above, for each symbol in the selected first symbol set, the example embodiments can include machine 100 randomly determining a corresponding arrangement position. As such, in an example where the arrangement is a column-and-row arrangement, machine 100 may randomly determine a column identifier and a row identifier (from a set of potential column identifier and row identifier combinations) for each symbol in the selected first symbol set. In an example where the arrangement has symbol position identifiers (e.g., whole number 1 through 15, inclusive, as described above), machine 100 may randomly select a symbol position identifier for each symbol in the selected first symbol set.

Where the column and row arrangement is used to simulate reels, machine 100 may display the each subset in a corresponding column, such as by superimposing each subset over a virtual reel in a corresponding column. Further, a sub-group 408 may represent an ordering of symbols on a particular reel.

FIG. 6 shows an example of a first symbol set 600 from the global symbol group for display during a bonus outcome event. As described above, the bonus outcome event can be initiated pursuant to machine 100 making a determination that one or more of the awarded outcome events have not yet occurred (i.e., remain to occur). The displayed first symbol set 600 includes (i) a single first portrait symbol at arrangement position C1,R3; (ii) a pair of second portrait symbols at arrangement positions C3,R3 and C5,R3; (iii) a single third portrait symbol at arrangement position C4,R2; (iv) a single Ace symbol at arrangement position C1,R2; (v) three King symbols at arrangement positions C2,R1 and C3,R2 and C4,R1; (vi) two Queen symbols at arrangement positions C1,R1 and C5,R1; (vii) four Jack symbols at arrangement positions C2,R2 and C3,R1 and C4,R3 and C5,R2; and (viii) a single Ten symbol at arrangement position C2,R3.

Returning to FIG. 3A, block 310 includes displaying, by the machine 100 on the symbol-display-portion of the display 110, the selected first symbol set.

Next, block 312 includes determining, by machine 100, using a stored payout table (not shown), a first payout amount, where the first payout amount is a function of the selected first symbol set and the received wager. Processor 112 can execute program instructions to determine whether a payout is earned (e.g., won) as a result of each outcome event occurring at machine 100. If a payout is not earned, the payout amount can be zero. If a payout is earned, the payout amount can be a function of the received wager and the symbol set selected for the outcome event (e.g., the first symbol set selected for the first outcome event) or the corresponding arrangements of symbols in the selected first symbol set.

Next, block 314, includes displaying, by display 110 of machine 100, the determined first payout amount. For example, where machine 100 has determined, using the stored payout table, a first payout amount of 500 credits, machine 100 may display on display 110 the determined payout amount of 500 credits. Additionally or alternatively, machine 100 may add the determined payout amount to the player credit balance and display the updated player credit balance. For instance, where the player credit balance was 99,750 credits before the payout amount was determined, machine 100 may add the determined payout amount of 500 credits to the player credit balance so that the updated balance is 100,250 credits. Furthermore, machine 100 can cause display 110 to display a count-up from a first balance amount (e.g., 99,750 credits) to a second balance amount (e.g., 100,250 credits), where the second balance amount equals a sum of the first balance amount and the determined payout amount.

In one example, machine 100 may also physically dispense a corresponding payout (e.g., cash), or otherwise facilitate the payout to the player (by adding funds to an electronic account associated with a gaming card). Additionally or alternatively to determining the payout amount, machine 100 may perform other actions to award the player. For instance, the machine may display an indication of a tangible prize. Other types of awards may be used as well.

Figure 3B:
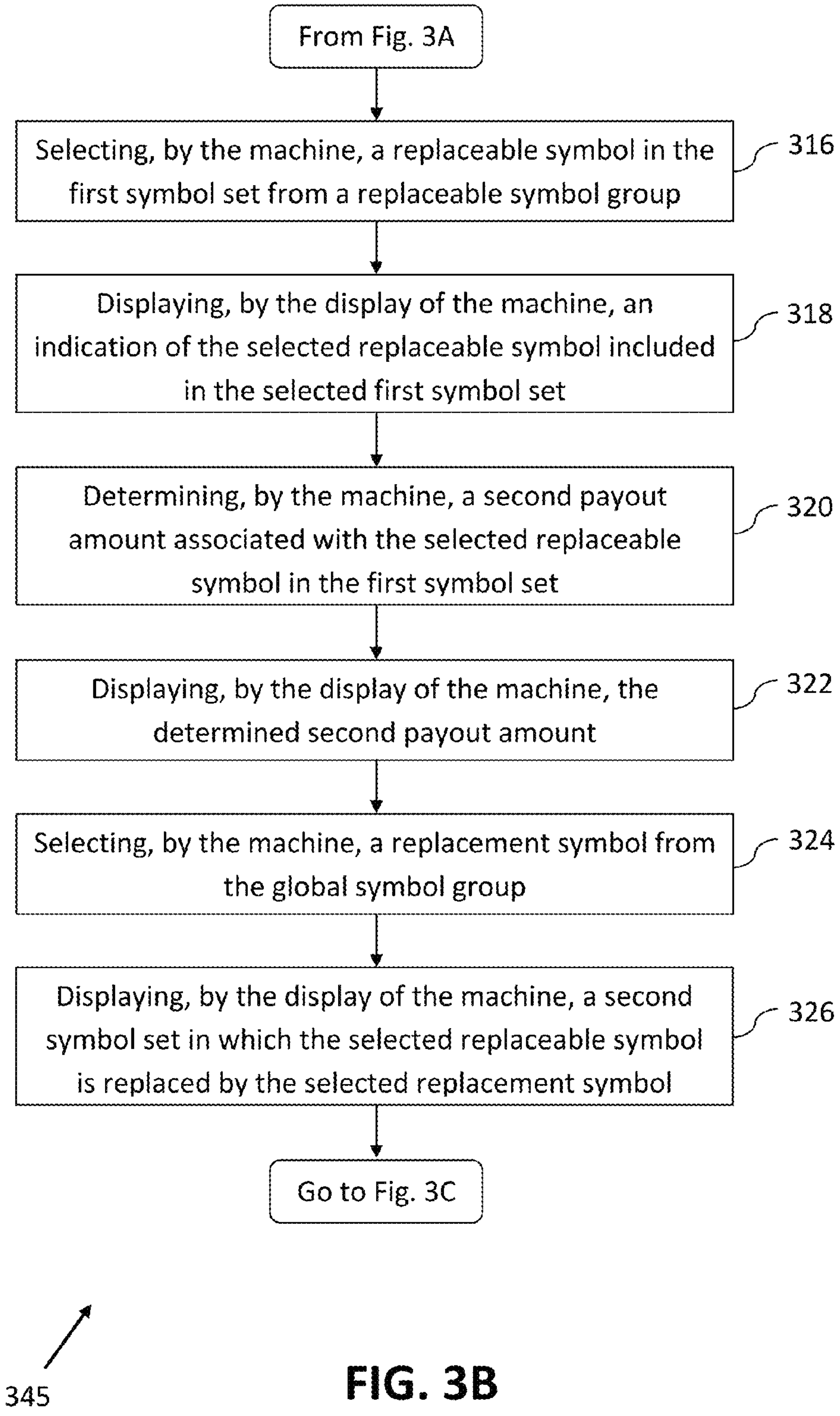
FIG. 3B is a second part of the flow chart of FIG. 3A, in accordance with example embodiments.

Turning to FIG. 3B, block 316 includes selecting, by machine 100, a replaceable symbol from a replaceable symbol group. The replaceable symbol group may be a subset of the global symbol group. In one example, the replaceable symbol group may include two or more replaceable symbols. Similar to the selection of the first symbol group, in one example, machine 100 may use a random number generator to select the replaceable symbol group from the global symbol group. In another example, the replaceable symbol group may be non-randomly selected, such as selected by a user (e.g. a player, machine designer, or casino personnel). In another example, the replaceable symbols may be predetermined.

In an example where there are multiple replaceable symbols in the replaceable symbol group and they include the so-called "royal" symbols (defined as "A", "K", "Q", "J" and "10" based on the respective Ace, King, Queen, Jack and Ten playing cards), FIG. 6 shows 11 occurrences of selected replaceable symbols 610 in the first symbol set 600 (at display positions C1,R1 and C1, R2; C2,R1 and C2,R2 and C3,R3; C3,R1 and C3,R2; C4,R1 and C4,R3; C5,R1 and C5,R2.

Next, block 318 includes displaying, by display 110, an indication of the selected replaceable symbol included in the selected first symbol set. The display 110 may display such an indication by highlighting, shading, hatching or adding a border around the corresponding selected replaceable symbols, but other indication techniques may also be used.

Next, block 320 includes determining, by machine 100, a second payout amount associated with the selected replaceable symbol included in the first symbol set. In one example, the second payout amount may be determined randomly by machine 100. In another example, the second payout amount may be determined by the machine 100 using a stored payout table (not shown).

In the example described above in which there are multiple replaceable symbols, machine 100 may determine a separate payout amount for each replaceable symbol and the second payout amount may be the cumulative total of such separate payout amounts.

Next, block 322 includes displaying, on the display 110, the determined second payout amount. In one example, the machine 100 may also physically dispense a corresponding payout amount (e.g., cash), or otherwise facilitate the payout to the player (by adding funds to an electronic account associated with a gaming card).

Next, block 324 includes selecting, by machine 100, a replacement symbol from the global symbol group. Again, the machine 100 may use a random number generator to select the replacement symbol. In the example where there are multiple replaceable symbols, machine 100 may select a corresponding replacement symbol from the global symbol group for each of the multiple replacement symbols.

Next, block 326 includes displaying, on the display 110, a second symbol set. The displayed second symbol set includes the selected replacement symbol together with the non-replaceable symbols in the first symbol set. In an example where there are multiple replacement symbols, the displayed second symbol set may be identical to the displayed first symbol set, except that each selected replaceable symbol is replaced by a corresponding selected replacement symbol.

Figure 3C:
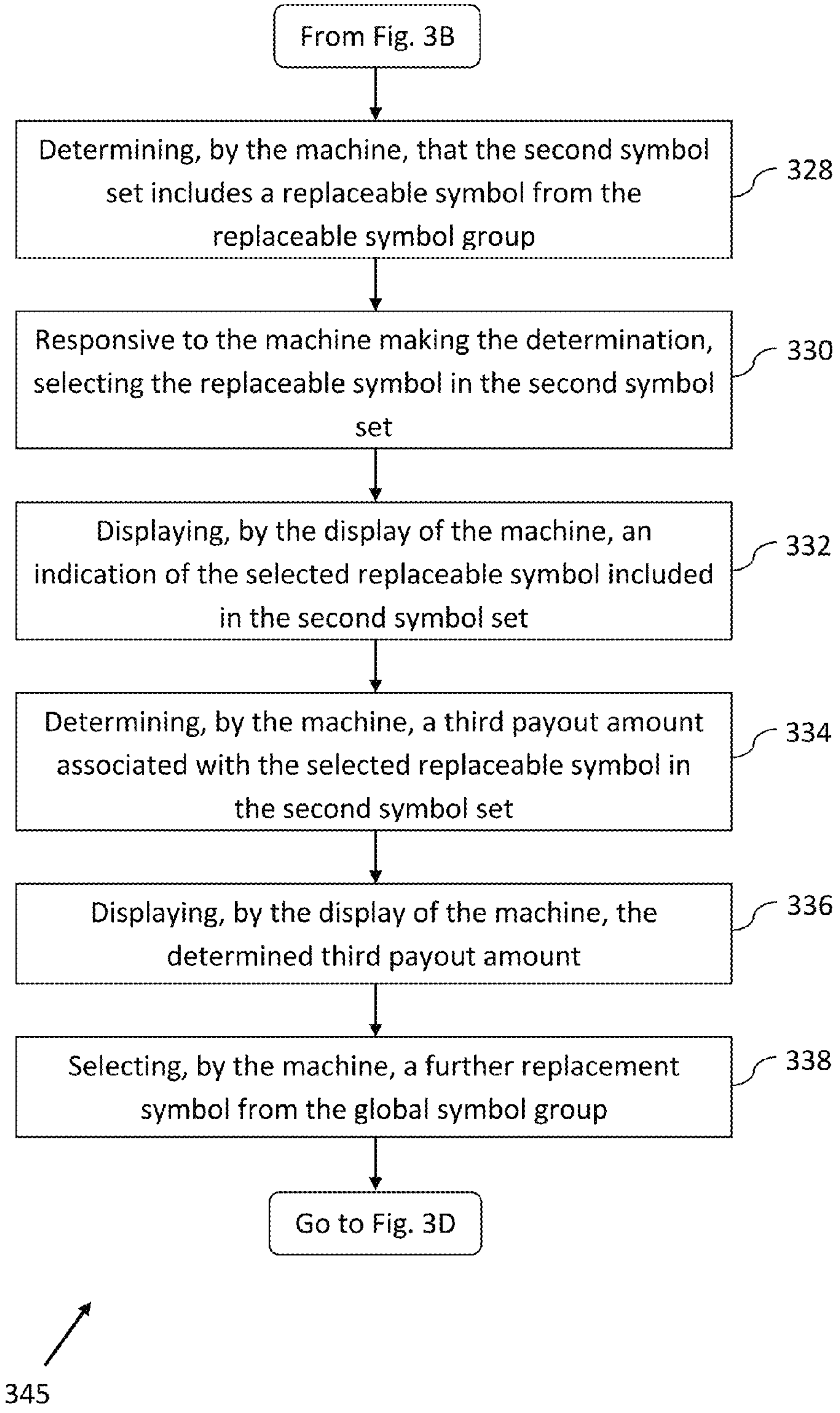
FIG. 3C is a third part of the flow chart of FIG. 3A, in accordance with example embodiments.

Turning to FIG. 3C, block 328 includes determining, by machine 100, whether the second symbol set includes a replaceable symbol from the replaceable symbol group. Block 330 includes selecting, by machine 100, the replaceable symbol in the second symbol set. Block 332 includes displaying, by display 110, an indication of the selected replaceable symbol included in the second symbol set. Next, block 334 includes determining, by machine 100, a third payout amount associated with the selected replaceable symbol included in the second symbol set. In an example where the second symbol set includes multiple replaceable symbols, machine 100 may determine a separate payout for each such replaceable symbol and the third payout amount may be the cumulative total of such separate payout amounts.

Next, block 336 includes displaying, on the display 110, the determined third payout amount associated with the selected replaceable symbol included in the second symbol set.

Figure 3D:
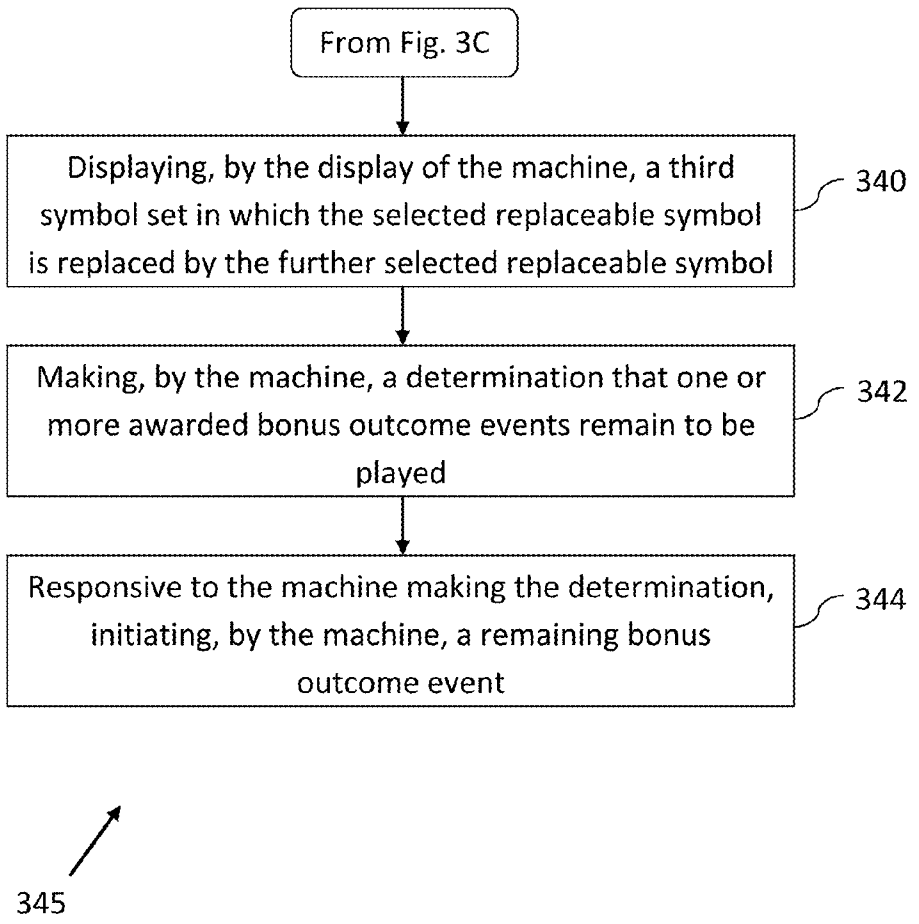
FIG. 3D is a fourth part of the flow chart of FIG. 3A, in accordance with example embodiments.

Next, block 338 includes selecting, by machine 100, a further replacement symbol from the global symbol group. Turning to FIG. 3D, block 340 includes displaying, on the display 110, a third symbol set. The displayed third symbol set includes the selected further replacement symbol together with the non-replaceable symbols in the second symbol set.

In one example, the operations of blocks 326 to 340 may be iterated repeatedly until machine 100 determines that the most-recently displayed third symbol set does not include any replaceable symbol from the selected replaceable symbol group.

Next, block 342 includes making, by machine 100, a determination that one or more of the awarded bonus outcome events remain to be played. In that regard, processor 112 may determine that one or more awarded bonus outcome events have not occurred. In response to making that determination, processor 112 can execute program instructions to determine a next symbol set (e.g., a second symbol set as described elsewhere in this description), a replaceable symbol from the replaceable symbol group as described elsewhere in this description) and a replacement symbol from the global symbol group.

Next, block 344 includes, responsive to machine 100 making the determination (i.e., the determination of block 342), initiating, by machine 100, a remaining bonus outcome event, as at block 308, by again selecting a first symbol set from the global symbol group. In other words, portions of the set 345 can repeat to carry out distinct outcome events of the predetermined number of events.

Stated yet another way, carrying out a next outcome event can include determining, by processor 112, a first symbol set to display within the symbol-display-portion 502 for the next (e.g., second) outcome event.

FIG. 7 shows an example of another first symbol set 700 selected from the global symbol group for display during an additional bonus outcome event. As described above, the additional bonus outcome event can be initiated pursuant to machine 100 making a determination that one or more of the awarded outcome events have not yet occurred (i.e., remain to occur). The displayed first symbol set 700 includes three replaceable symbols from a replaceable symbol group that comprises the Ace, King, Queen, Jack and Ten symbols, i.e., single Ace, King and Queen symbols 702, 704 and 706 at respective symbol positions C5,R1 and C2,R2 and C5,R3. The remaining symbols in the first symbol set (i.e. the different portrait symbols) do not belong to the replaceable symbol group.

Figure 8:
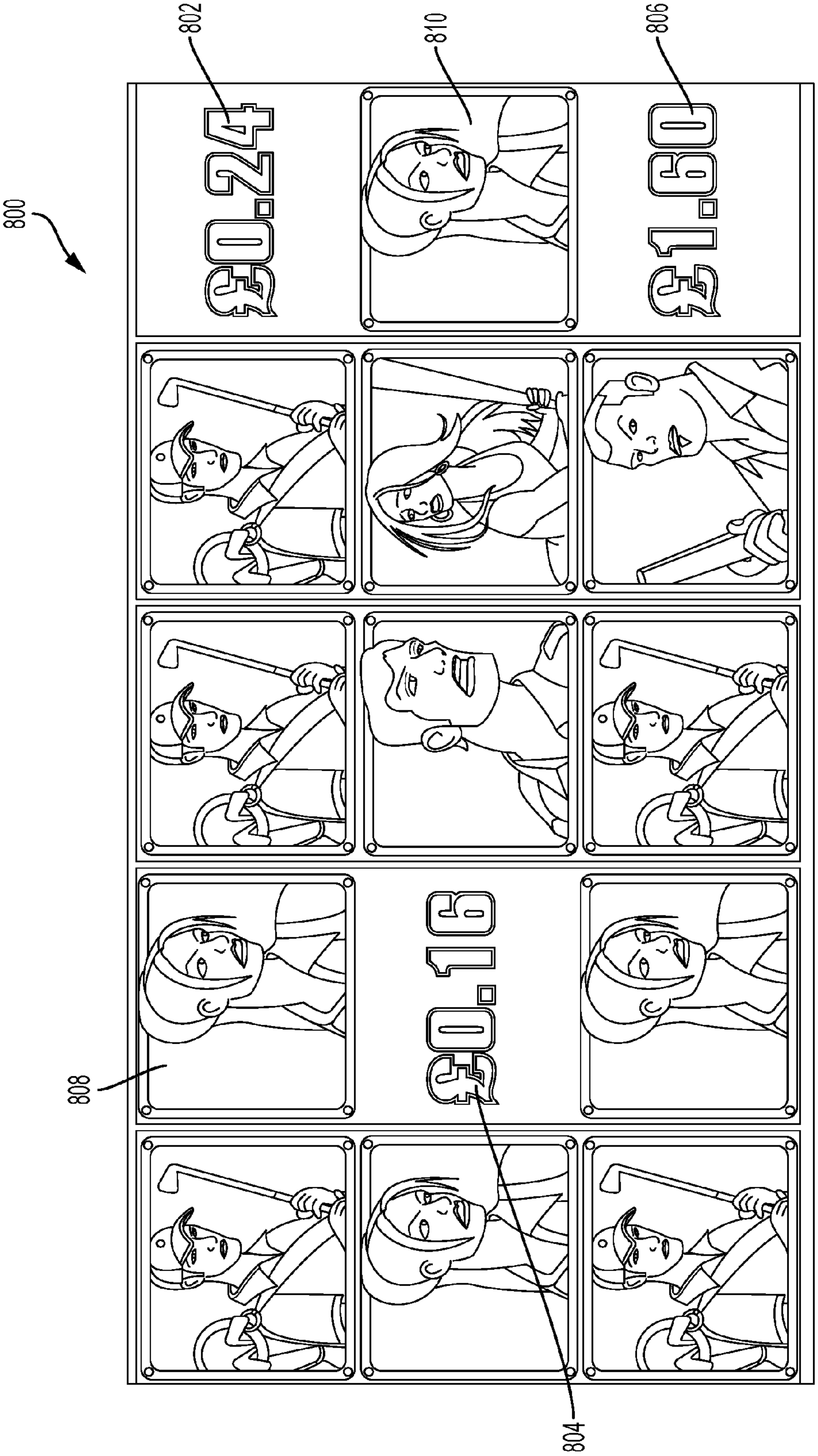
FIG. 8 depicts an example of the symbol set of FIG. 7 that includes a number of payout amounts, in accordance with example embodiments.

The machine 100 may thus determine a separate payout amount for each of these replaceable symbols 702, 704 and 706 and display each such separate payout amount at the symbol position of its corresponding replaceable symbol. As illustrated in FIG. 8, the separate payout amount may be displayed in place of its corresponding replaceable symbol. Alternatively, the separate payout amount may be displayed together with its corresponding replaceable symbol. Referring to FIG. 8, the machine 100 may cause symbol position C5,R1 to display a separate payout 802 of £0.24 in place of replaceable Ace symbol 702 of FIG. 7, symbol position C2,R2 to display a separate payout 804 of £0.16 in place of the replaceable King symbol 704 of FIG. 7, and symbol position C5,R3 to display a separate payout 806 of £1.60 in place of the replaceable Queen symbol 706 of FIG. 7.

Figure 9:
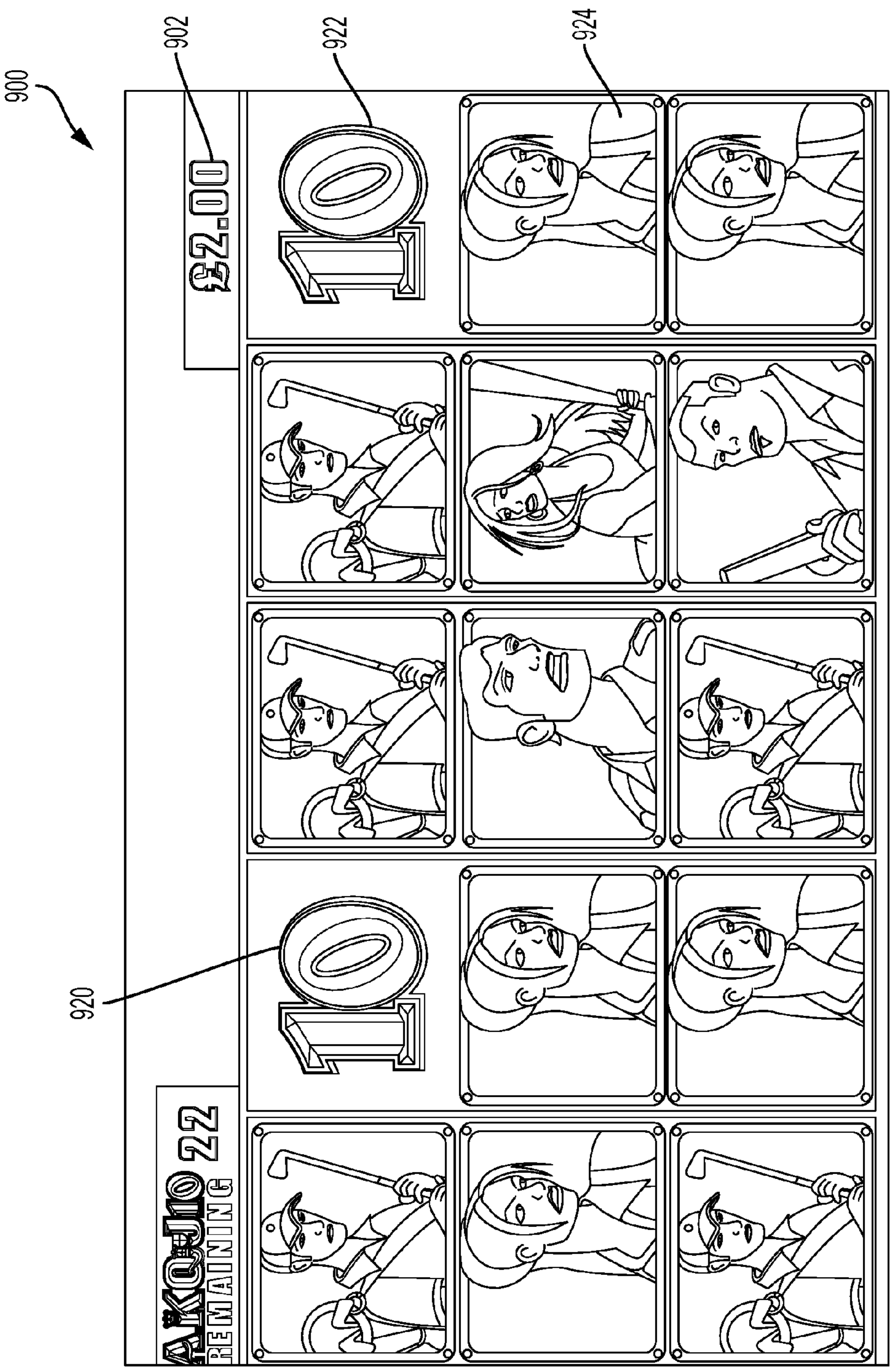
FIG. 9 depicts an example of the symbol set of FIG. 8 including a number of replacement symbols, in accordance with example embodiments.

Turning now to FIG. 9, machine 100 may consolidate the three separate payouts amounts 802, 804 and 806 into a second payout amount of £2.00 (i.e., £0.24+£0.16+£1.60) and display the second payout amount 902.

Furthermore, machine 100 may directly replace each of the separate payout amounts 802, 804 and 806 in FIG. 8 with a corresponding replacement symbol.

Alternatively, non-replaceable symbols in each vertical SDS of the symbol-display-portion may cascade downwards into symbol positions occupied by any displayed separate payout amounts. One or more replacement symbols may then cascade vertically into the SDS to occupy any unused symbol positions, as necessary. As illustrated in FIG. 9, portrait symbol 808 at symbol position C2,R1 of FIG. 8 has cascaded downwards into symbol position C2,R2 that was previously occupied by payout amount 804 of £0.16 relating to the replaceable King symbol 704 of FIG. 7. A replacement symbol, in this instance a Ten symbol 920, has cascaded downwards into the now unused symbol position C2,R1.

Similarly, the portrait symbol 710 at symbol position C5,R2 of FIG. 7 has cascaded downwards into symbol position C5,R3 previously occupied by the payout amount 806 of £1.60 relating to the replaceable Queen symbol 706 of FIG. 7. A replacement symbol 924, in this instance a Portrait symbol, has cascaded downwards into the now unused symbol position C5,R2. A further replacement symbol, namely a Ten symbol 922, has cascaded downwards into symbol position C5,R1 to replace payout amount 802 of £0.24 relating to the replaceable Ace symbol 702 of FIG. 7.

The symbol set 900 of FIG. 9 constitutes the second symbol set as described above in relation to block 326, which includes the non-replaceable symbols in the first symbol set 700 and in which each replaceable symbol in the first symbol set has been replaced by a corresponding selected replacement symbol Machine 100 may determine whether the second symbol set 900 includes any replaceable symbols from the replaceable symbol group. As the only new symbols in the second symbol set are replacement symbols, this determination involves machine 100 determining whether any of the symbols in the second symbol set 900 are themselves replaceable symbols. As illustrated in FIG. 9, only two of the replacement symbols 920, 922 and 924 are themselves replaceable symbols, namely the Ten symbol 920 at symbol position C2,R1 and another Ten symbol 922 at symbol position C5,R1.

Figure 10:
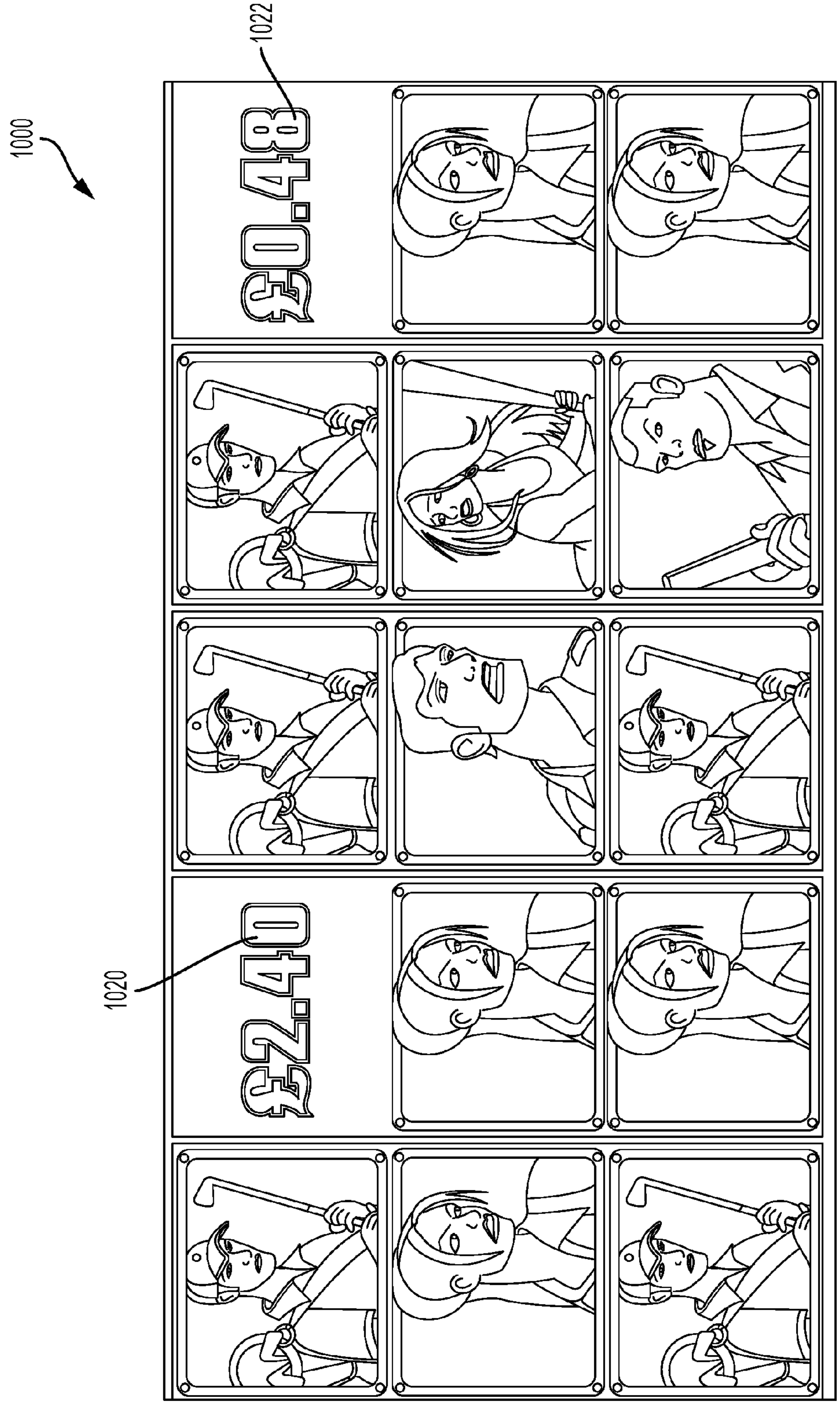
FIG. 10 depicts an example of the symbol set of FIG. 9 including a number of payout amounts, in accordance with example embodiments.

Machine 100 may determine a separate payout amount for each of these replaceable symbols 920 and 922 in the second symbol set 900. Referring now to FIG. 10, the machine 100 may cause symbol position C2,R1 to display a separate payout 1020 of £2.40 in place of replaceable Ten symbol 920 in the second symbol set, and cause symbol position C5,R1 to display a separate payout 1022 of £0.48 in place of replaceable Ten symbol 922.

Figure 11:
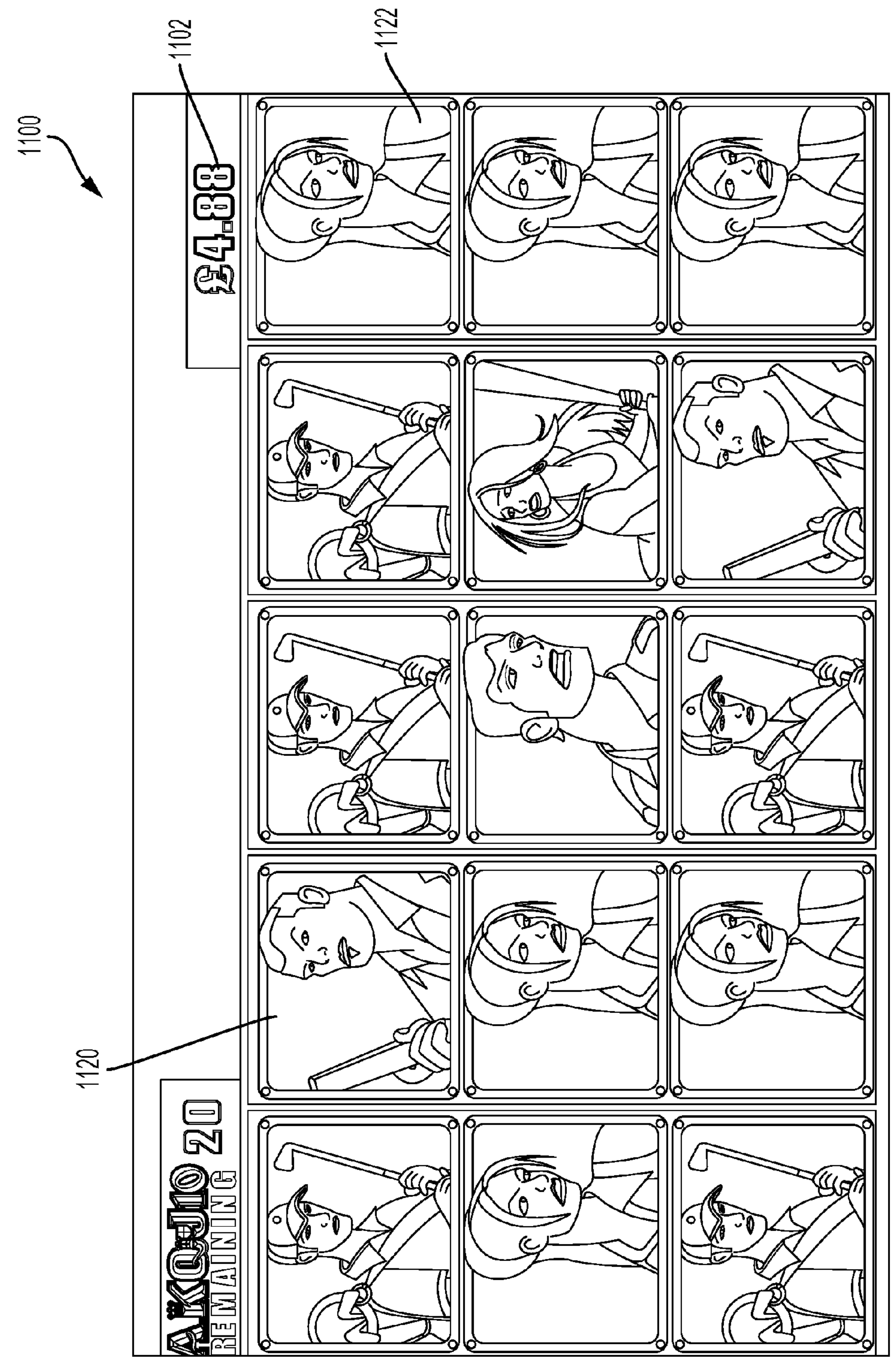
FIG. 11 depicts an example of the symbol set of FIG. 10 including a number of replacement symbols in accordance with an embodiment of the disclosure.

As illustrated in FIG. 11, machine 100 may consolidate the two separate payout amounts 1020 and 1022 into a third payout amount of £2.88 (i.e., £2.40+£0.48) and accumulate the third payout amount with the second payout amount 902 of £2.00 in FIG. 9. The accumulated payout of £4.88 is indicated by reference numeral 1102 in FIG. 11.

Replacement symbols 1120 and 1122 have cascaded vertically into the symbol positions C2,R1 and C5,R1 that were, respectively, occupied by payout amount 1020 of £2.40 and payout amount 1022 of £0.48. Replacement symbols 1120 and 1122 are different Portrait symbols from the global symbol group.

The symbol set 1100 of FIG. 11 constitutes the third symbol set as described in relation to block 340, which includes the non-replaceable symbols in the second symbol set 800 and in which each replaceable symbol in the second symbol set has been replaced by a corresponding replacement symbol.

The third symbol set 1100 does not include any symbols from the replaceable symbol group, thereby completing execution of the current bonus outcome event.

Machine 100 can cause symbol-display-segments to spin, and to cause spinning symbol-display-segments to stop spinning. The spinning and stopping of the spinning symbol-display-segments can be carried out for each outcome event. In accordance with the embodiments in which the symbol-display-portion 502 includes columns or reels that spin from top to bottom or bottom to top, spinning the reels can include starting the spinning from a left-most column or reel to a right-most column or reel. Stopping the reels can occur using a similar sequence. Other sequences of spinning and stopping the spinning can be used. Moreover, the spinning or stopping of spinning of two or more columns or reels could occur simultaneously.

Notably, the operations of replacing, reordering, adding, and/or removing symbols from a reel of a reel-based game (e.g., the operations of blocks 326 and 340 as just two possible examples), necessitate computer implementation. In a mechanical reel-based game, the symbols appearing on each reel are fixed and cannot be changed mid-game. In contrast, the computer implementation herein allows the number of symbols per reel to be changed, as well as the symbols appearing on each reel to be replaced and/or re-ordered. These changes can occur mid-game, for example between spins of the reels. Consequently, these features of the disclosure herein would not exist but for computer technology.

Further, these features are an improvement to reel-based gaming technology. Since the symbols appearing on each reel are fixed and cannot be changed mid-game in mechanical reel-based games, the operations of replacing, reordering, adding, and/or removing symbols from a reel could not appear in such games. Due to this technological limitation, players may become disinterested in these basic reel-based games. Computer implementation, however, facilitates the integration of these features into reel-based games, resulting in game dynamics that would otherwise be unavailable. Consequently, the disclosure herein is a technological improvement to reel-based games.

IV. Additional Example Operations

FIG. 12A-12E depict a flowchart showing a set of operations 1200 (or more simply, "the set 1200") that can, for example, be carried out using server machine 100*a*. Note that several of the operations described in connection with FIG. 12A-12E parallel operations described in connection with FIG. 3A-3D. As such, variations of the operations described in connection with FIG. 3A-3D are likewise applicable to the operations described in connection with FIG. 12A-12E. However, for the sake of brevity, these variations are not repeated. The server machine 100*a*, in performing the set 1200, can perform the operations described above with respect to machine 100.

Figure 12A:
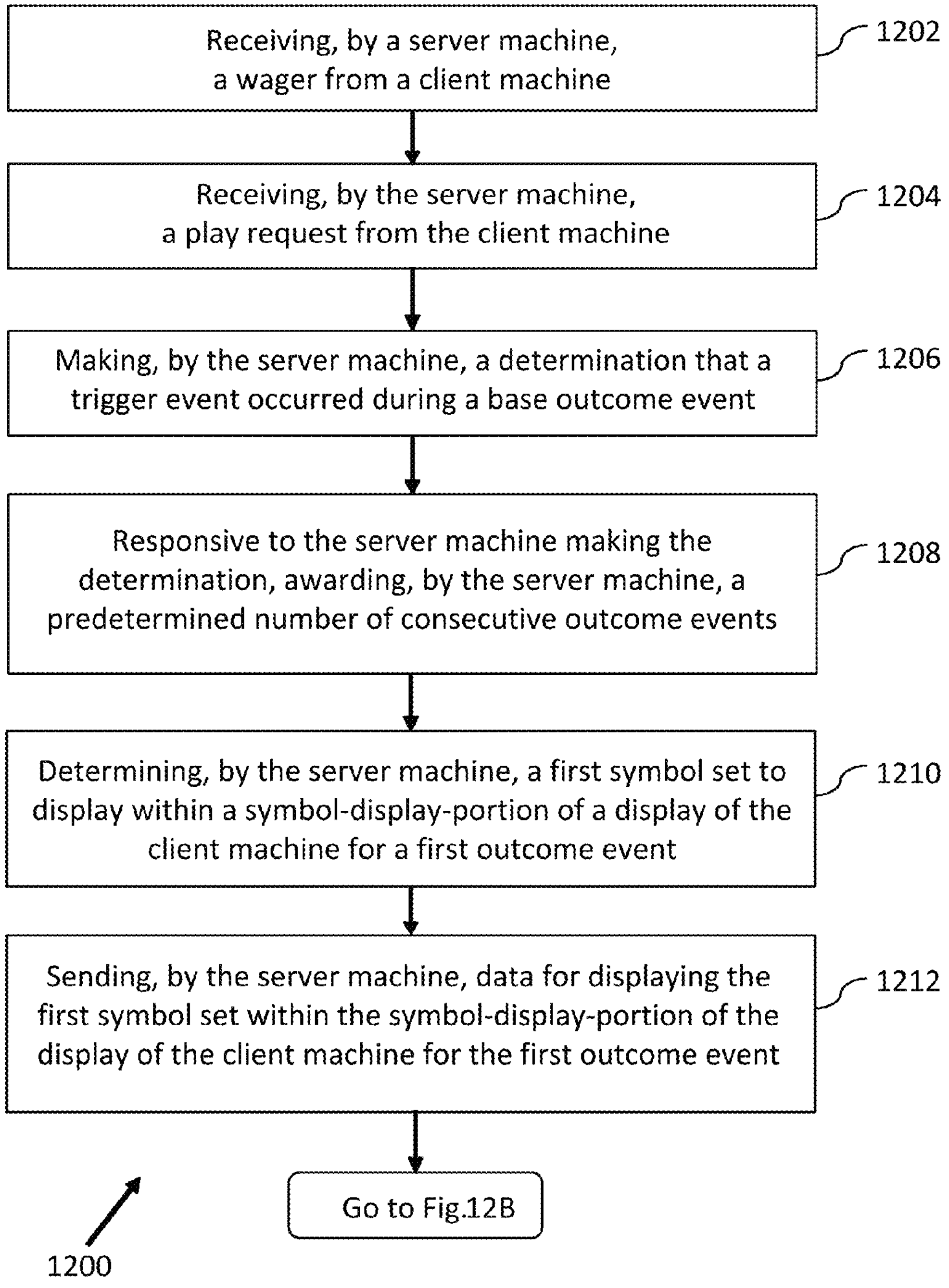
FIG. 12A is a first part of a flow chart, in accordance with example embodiments.

Turning to FIG. 12A, block 1202 includes receiving, by the server machine 100*a*, a wager from the client machine 100*b*.

Next, block 1204 includes receiving, by the server machine 110*a*, a play request from the client machine 100*b*.

Next, block 1206 includes making, by the server machine 110*a*, a determination that a trigger event occurred during a base outcome event.

Next, block 1208 includes awarding, by the server machine 110*a*, a predetermined number of consecutive outcome events.

Next, block 1210 includes determining, by the server machine 100*a*, a first symbol set to display within the symbol-display-portion of the display 110*b* of the client machine 100*b* for a first outcome event.

Next, block 1212 includes sending, by the server machine 100*a*, data for displaying the first symbol set within the symbol-display-portion of the display 110*b* of the client device 100*b*.

Figure 12B:
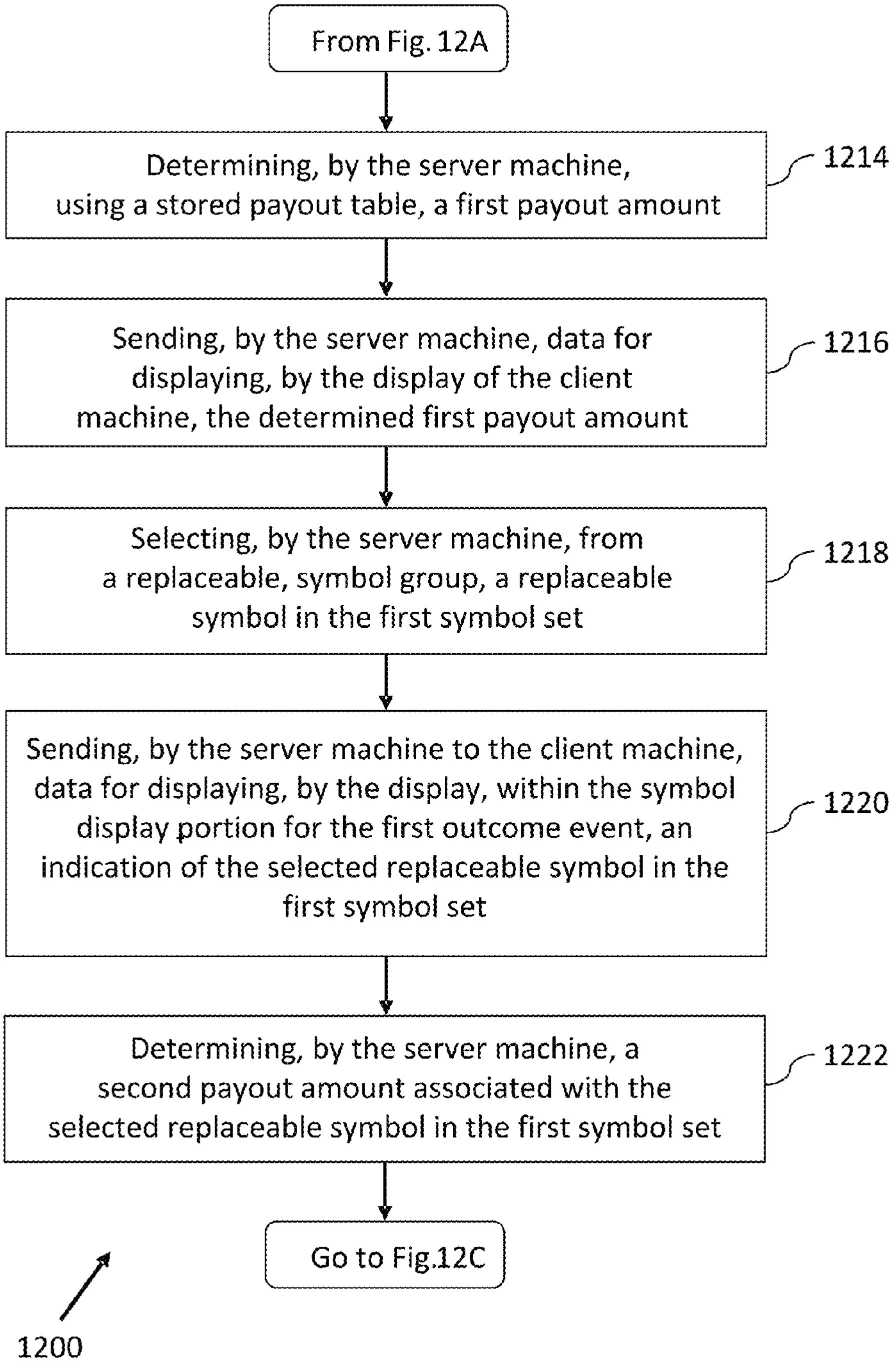
FIG. 12B is a second part of the flow chart of FIG. 12A, in accordance with example embodiments.

Turning to FIG. 12B, block 1214 includes determining, by the server machine 100*a* using a stored payout table, a first payout amount.

Next, block 1216 includes sending, by the server machine 100*a*, data for displaying, by the display 110*b* of the client machine 100*b*, the determined first payout amount.

Next, block 1218 includes selecting, by the server machine 100*a* from a replaceable symbol group, a replaceable symbol in the first symbol set.

Next, block 1220 includes sending, by the server machine 100*a*, data for displaying, by the display 110*b* of the client machine 100*b*, an indication of the selected replaceable symbol in the first symbol set.

Next, block 1222 includes determining, by the server machine 100*a*, a second payout amount associated with the selected replaceable symbol in the first symbol set.

Figure 12C:
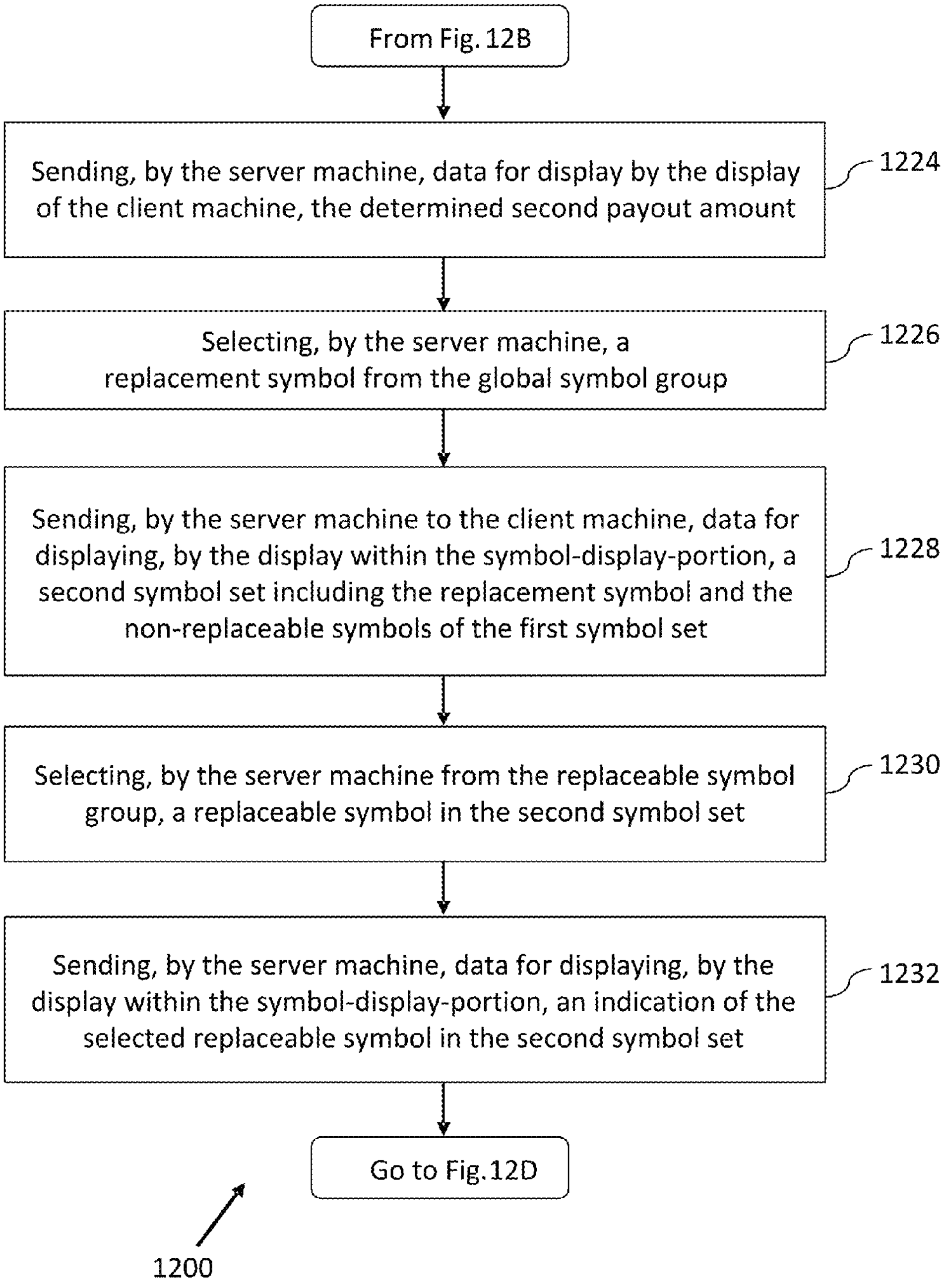
FIG. 12C is a third part of the flow chart of FIG. 12A, in accordance with example embodiments.

Turning to FIG. 12C, block 1224 includes sending, by the server machine 100*a*, data for displaying, by the display device 110*b* of the client machine 100*b*, the determined second payout amount.

Next, block 1226 includes selecting, by the server machine 100*a*, a replacement symbol from the global symbol group.

Next, block 1228 includes sending, by the server machine 100*a*, data for displaying, by the display 110*b* of the client machine 100*b*, a second symbol set including the non-replaceable symbols of the first symbol set together with the selected replacement symbol.

Next, block 1230 includes selecting, by the server machine 100*a* from the replaceable symbol group, a replaceable symbol in the second symbol set.

Next, block 1232 includes sending, by the server machine 100*a*, data for displaying, by the display 110*b* of the client machine 100*b*, an indication of the selected replaceable symbol in the second symbol set.

Figure 12D:
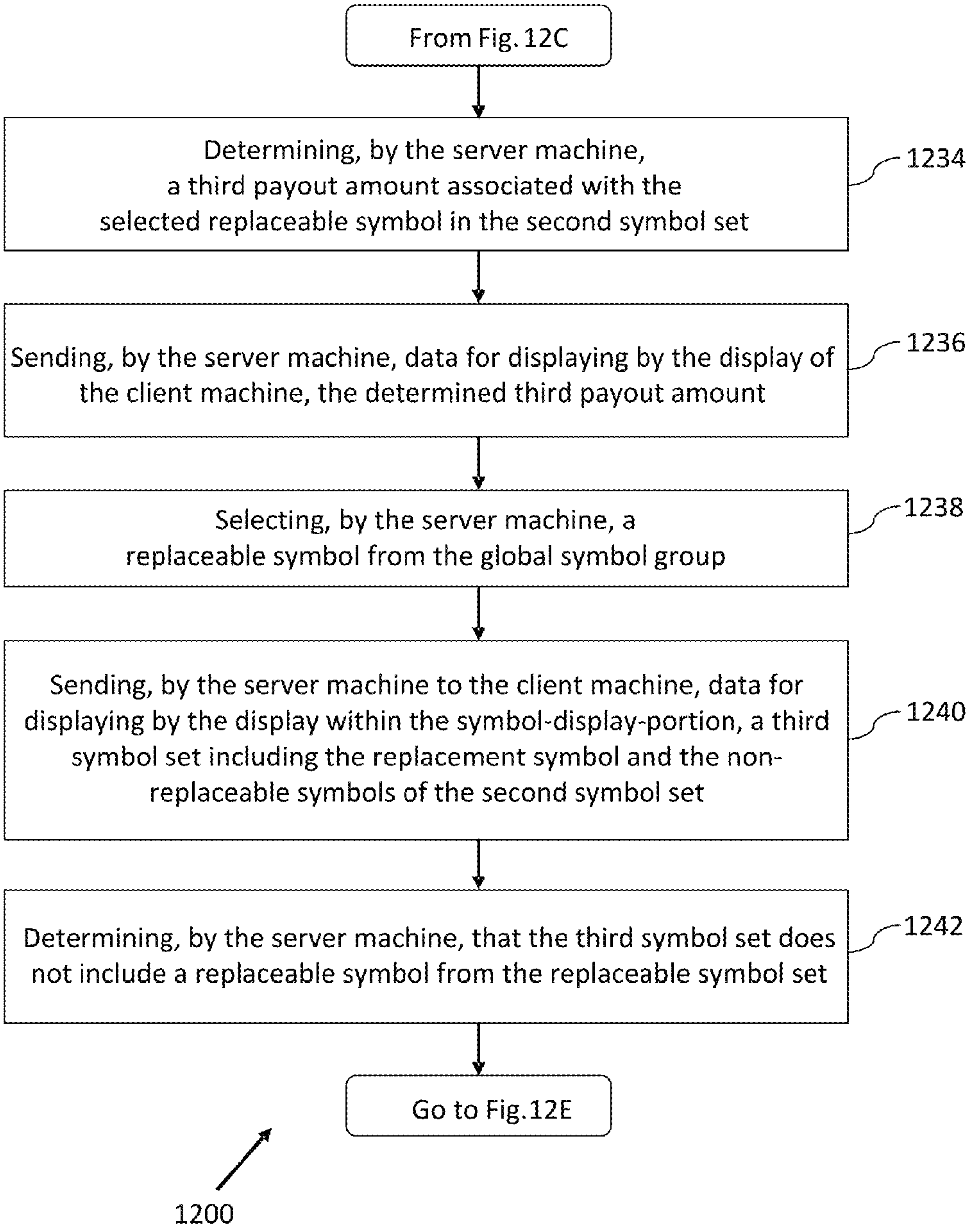
FIG. 12D is a fourth part of the flow chart of FIG. 12A, in accordance with example embodiments.

Turning to FIG. 12D, block 1234 includes determining, by the server machine 100*a*, a third payout amount associated with the selected replaceable symbol in the second symbol set.

Next, block 1236 includes sending, by the server machine 100*a*, data for displaying, by display 110*b* of the client machine 100*b*, the determined third payout amount.

Next, block 1238 includes selecting, by the server machine 100*a*, a replacement symbol from the global symbol group.

Next, block 1240 includes sending, by the server machine 100*a*, data for displaying, by the display 110*b* of the client machine 100*b*, a third symbol set including the non-replaceable symbols of the second symbol set together with the selected replacement symbol.

Next, block 1242 includes determining, by the server machine 100*a*, that the third symbol set does not include a replaceable symbol from the replaceable symbol group.

Figure 12E:
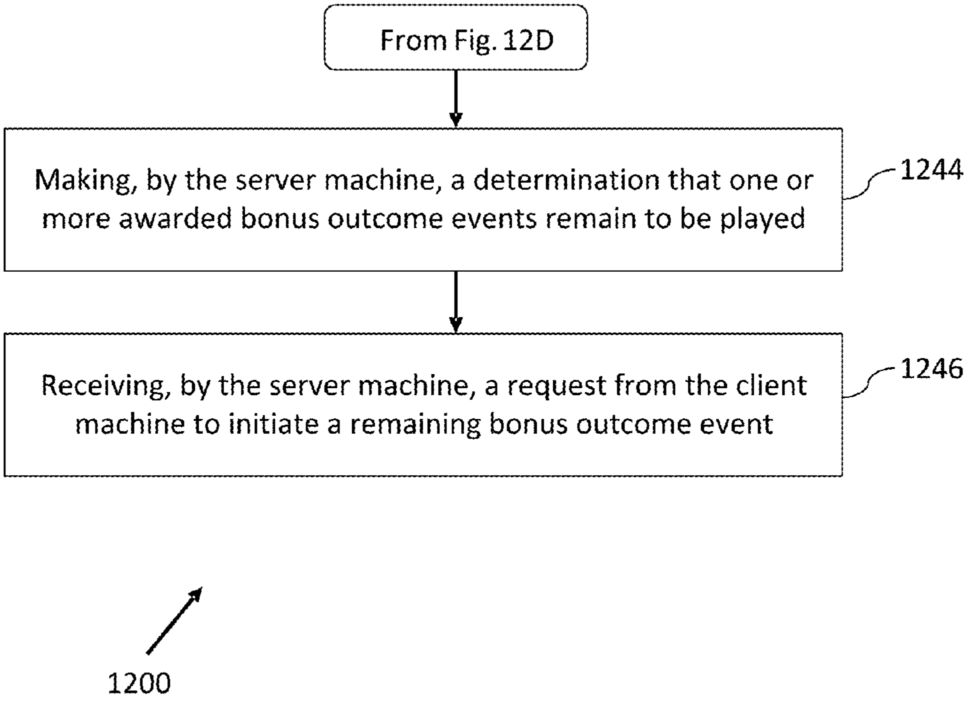
FIG. 12E is a fifth part of the flow chart of FIG. 12A, in accordance with example embodiments.

Turning to FIG. 12E, block 1244 includes determining, by the server machine 100*a*, that one or more awarded bonus outcome events remain to be played.

Next, block 1246 includes receiving, by the server machine 100*a*, a request from the client device 100*b* to initiate a remaining bonus outcome event.

Figure 13A:
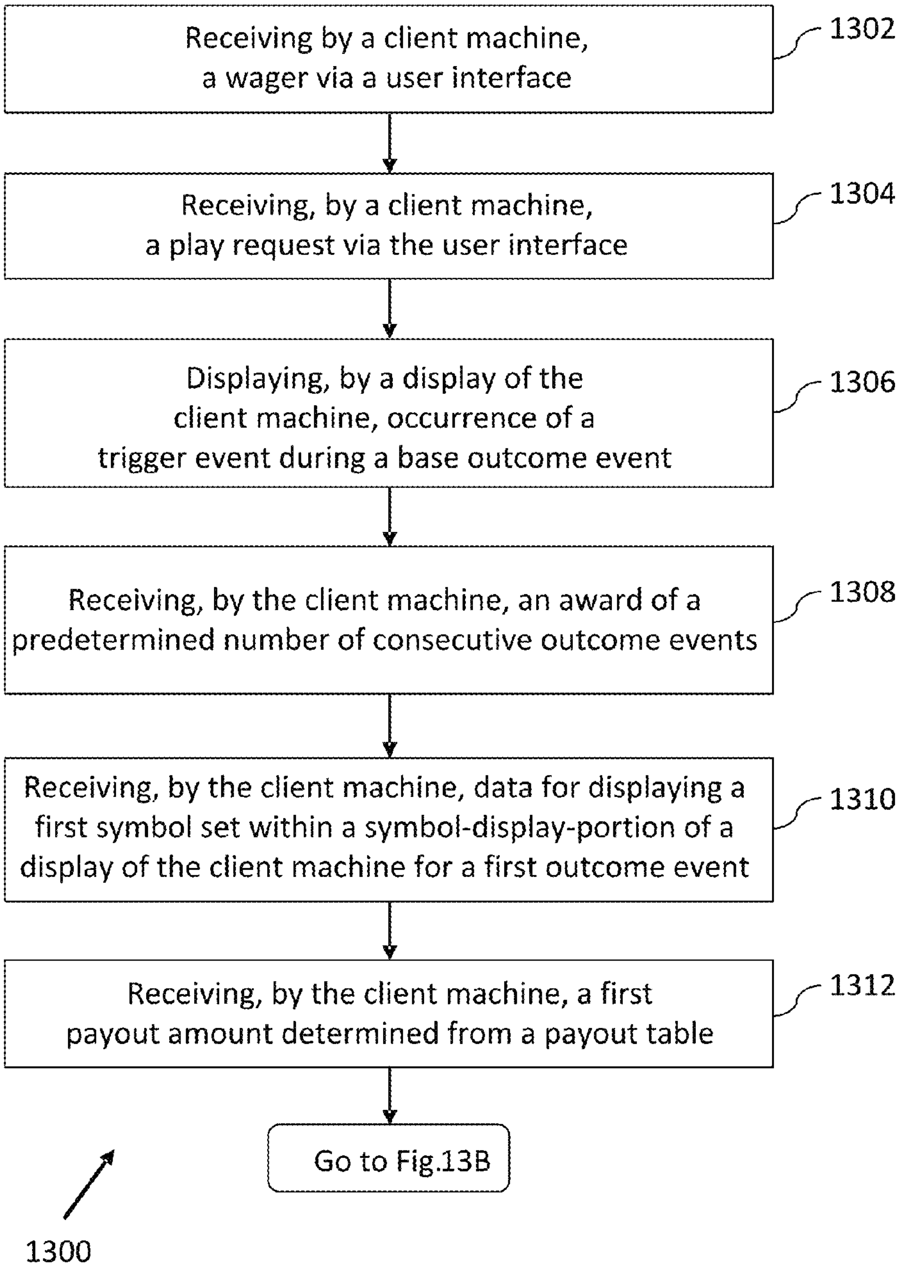
FIG. 13A is a first part of a flow chart, in accordance with example embodiments.
Figure 13B:
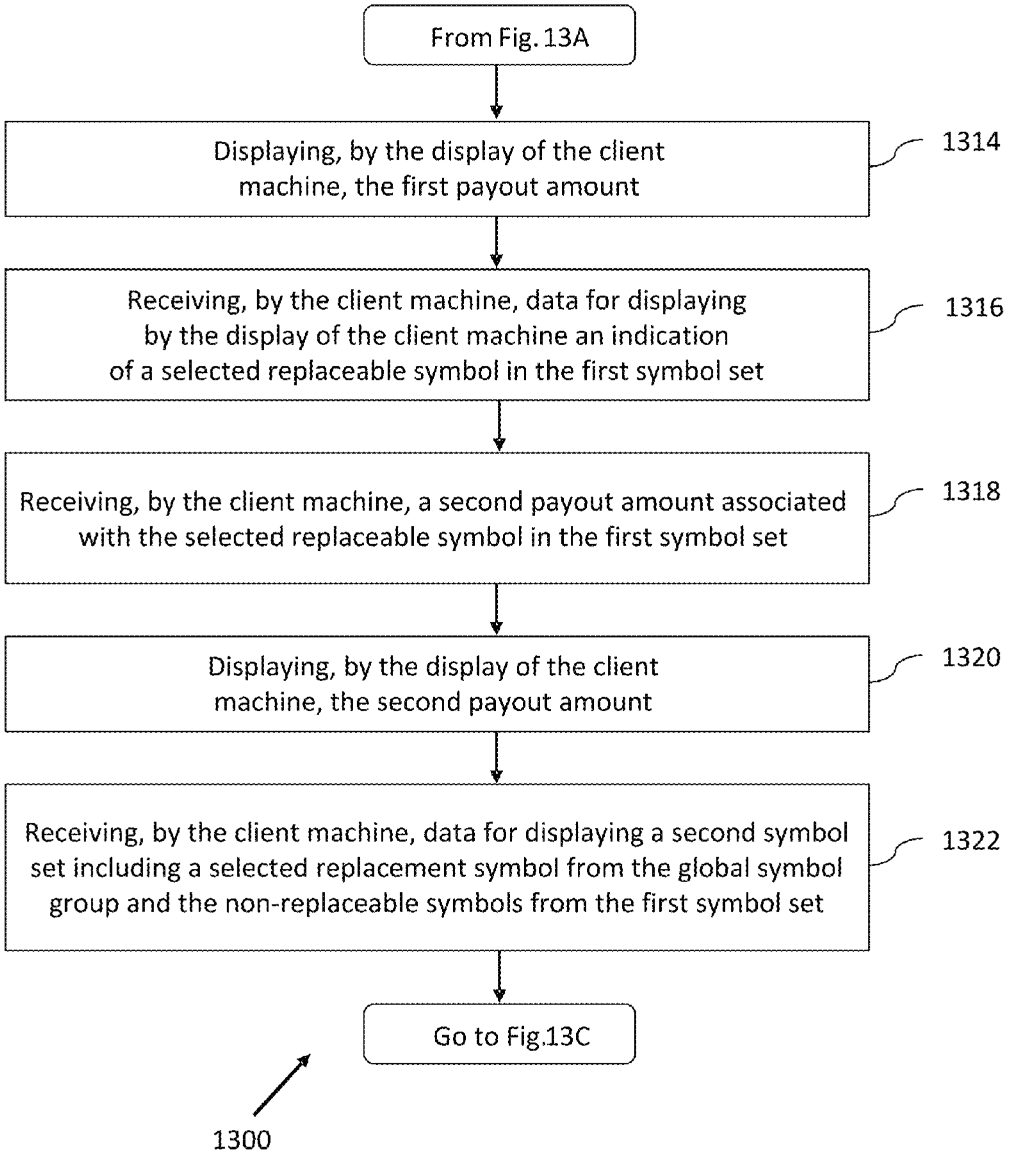
FIG. 13B is a second part of the flow chart of FIG. 13A, in accordance with example embodiments.
Figure 13C:
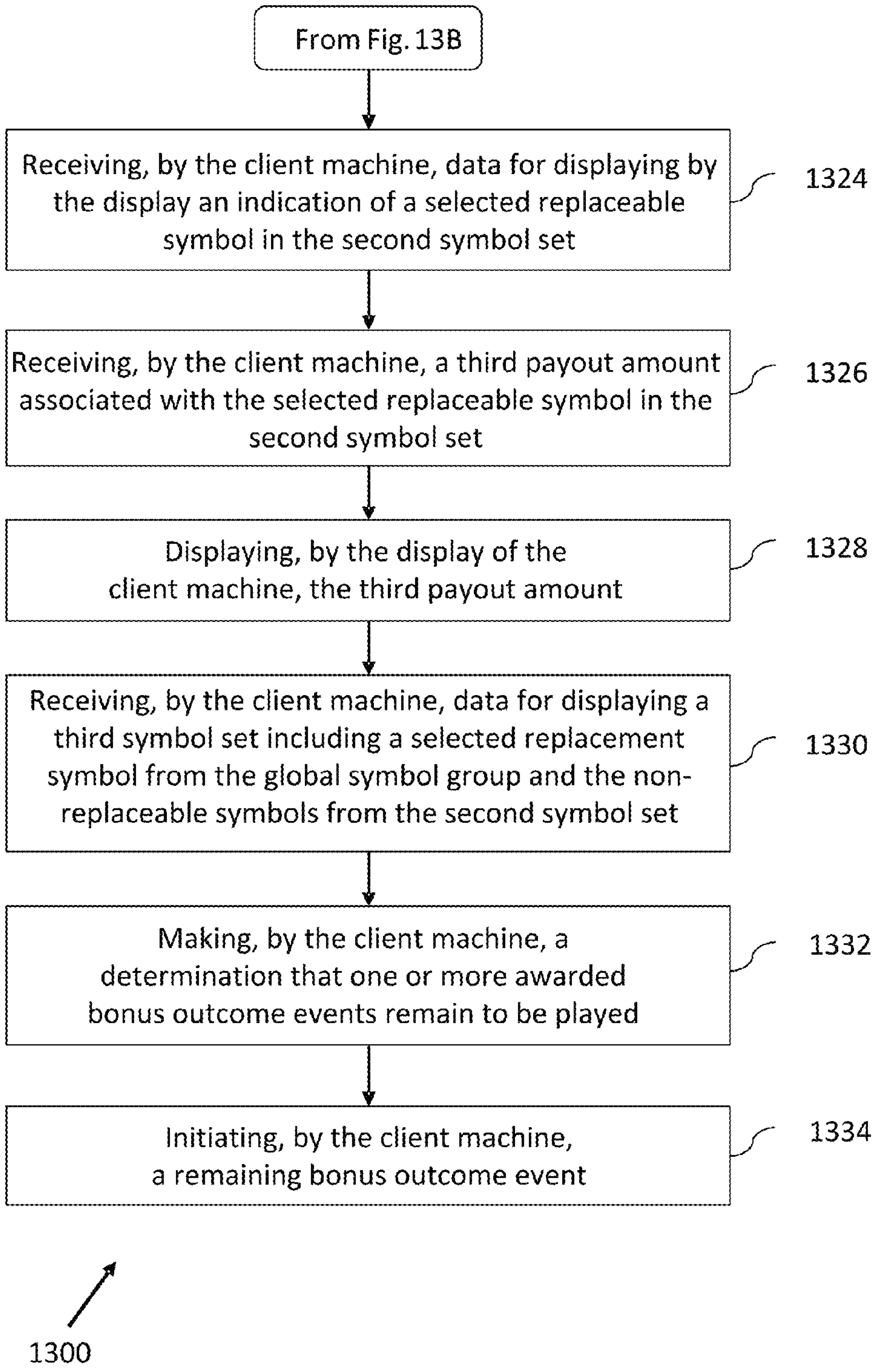
FIG. 13C is a third part of the flow chart of FIG. 13A, in accordance with example embodiments.

FIG. 13A-13C depict a flowchart showing a set of operations 1300 (or more simply, "the set 1300") that can, for example, be carried out using client machine 100*b*. Note that several of the operations described in connection with FIG. 13A-13C parallel operations described in connection with FIGS. 3A-3D and FIG. 12A-12E. As such, variations of the operations described in connection with FIGS. 3A-3D and FIG. 12A-12E are likewise applicable to the operations described in connection with FIG. 13A-13C. However, for the sake of brevity, these variations are not repeated. The client machine 100*b*, in performing the set 1300, can perform the operations described above with respect to machine 100.

Turning to FIG. 13A, block 1302 includes receiving, by the client machine 100*b*, a wager via the user interface 104*b*. Client machine 100*b* can transmit the received wager or data indicative thereof over the communication network 116 to server machine 100*a*.

Next, block 1304 includes receiving, by the client machine 100*b*, a play request via the user interface 104*b*. Client machine 100*b* can transmit the received play request or data indicative thereof over the communication network 116 to server machine 100*a*.

Next, block 1306 includes displaying, by a display 110*b* of the client machine 100*b*, occurrence of a trigger event during a base outcome event.

Next, block 1308 includes receiving, by the client machine 100*b*, an award of a predetermined number of consecutive outcome events.

Next, block 1310 includes receiving, by the client machine 100*b*, data for displaying a first symbol set within the symbol-display-portion of the display 110*b* for a first outcome event.

Next, block 1312 includes receiving, by the client machine 110*b*, a first payout amount determined from a payout table.

Turning to FIG. 13B, block 1314 includes displaying, by the display 110*b* of the client machine 100*b*, the determined first payout amount.

Next, block 1316 includes receiving, by the client machine 100*b*, data for displaying an indication of a selected replaceable symbol in the first symbol set from a replaceable symbol group.

Next, block 1318 includes receiving, by the client machine 100*b*, a second payout amount associated with the selected replaceable symbol in the first symbol set.

Next, block 1320 includes displaying, by the display 110*b* of the client machine 100*b*, the determined second payout amount.

Next, block 1322 includes receiving, by the client machine 100*b*, data for displaying a second symbol set including the non-replaceable symbols of the first symbol set together with a selected replacement symbol from the global symbol group.

Turning to FIG. 13C, block 1324 includes receiving, by the client machine 100*b*, data for displaying an indication of a selected replaceable symbol in the second symbol set from a replaceable symbol group.

Next, block 1326 includes receiving, by the client machine 100*b*, a third payout amount associated with the selected replaceable symbol in the second symbol set.

Next, block 1328 includes displaying, by the display 110*b* of the client machine 100*b*, the determined third payout amount.

Next, block 1330 includes receiving, by the client machine 100*b*, data for displaying a third symbol set including the non-replaceable symbols in the second symbol set together with a selected replacement symbol from the global symbol group.

Next, block 1332 includes making, by the client machine 100*b*, a determination that one or more awarded bonus outcome events remain to be played.

Next, block 1334 includes initiating, by the client machine, a remaining bonus outcome event.

Figure 14:
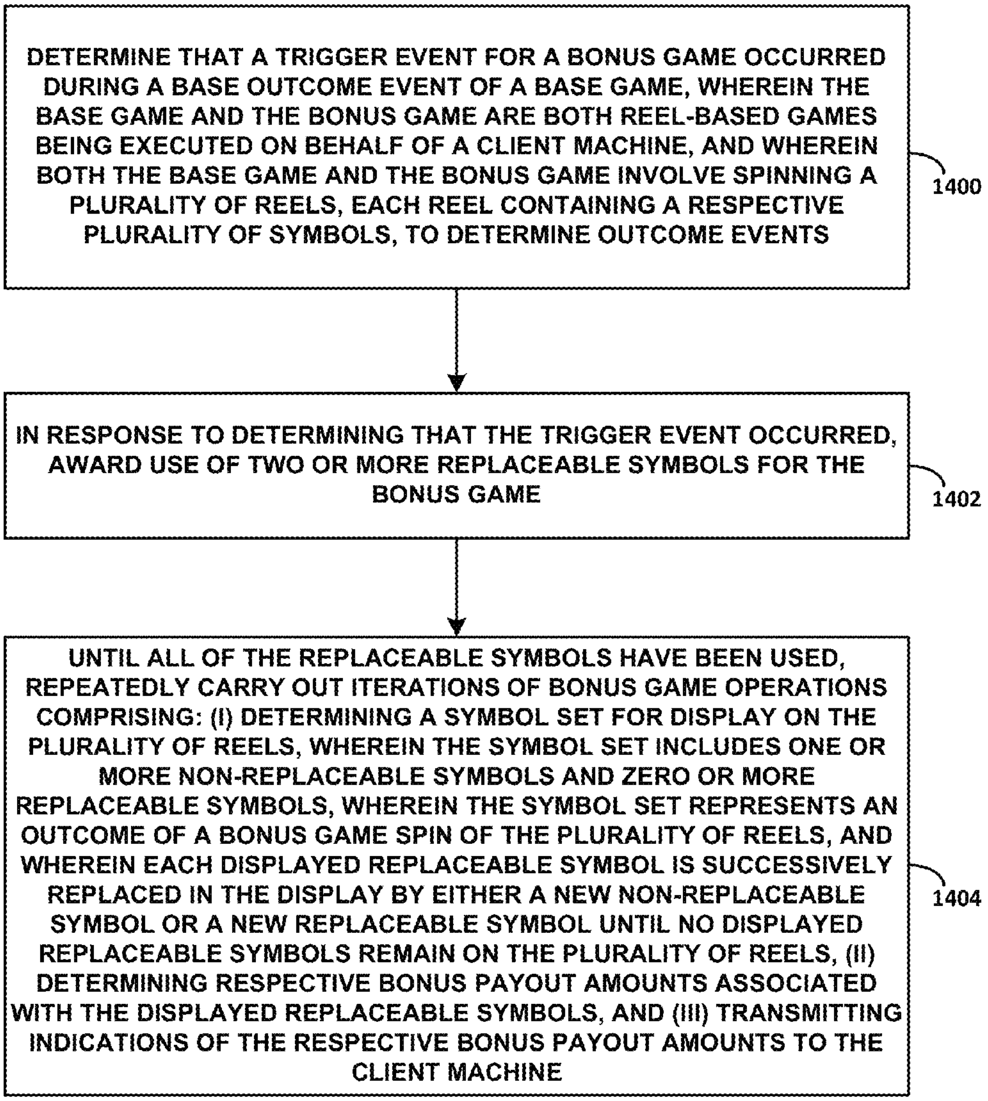
FIG. 14 is another flow chart, in accordance with example embodiments.
Figure 15:
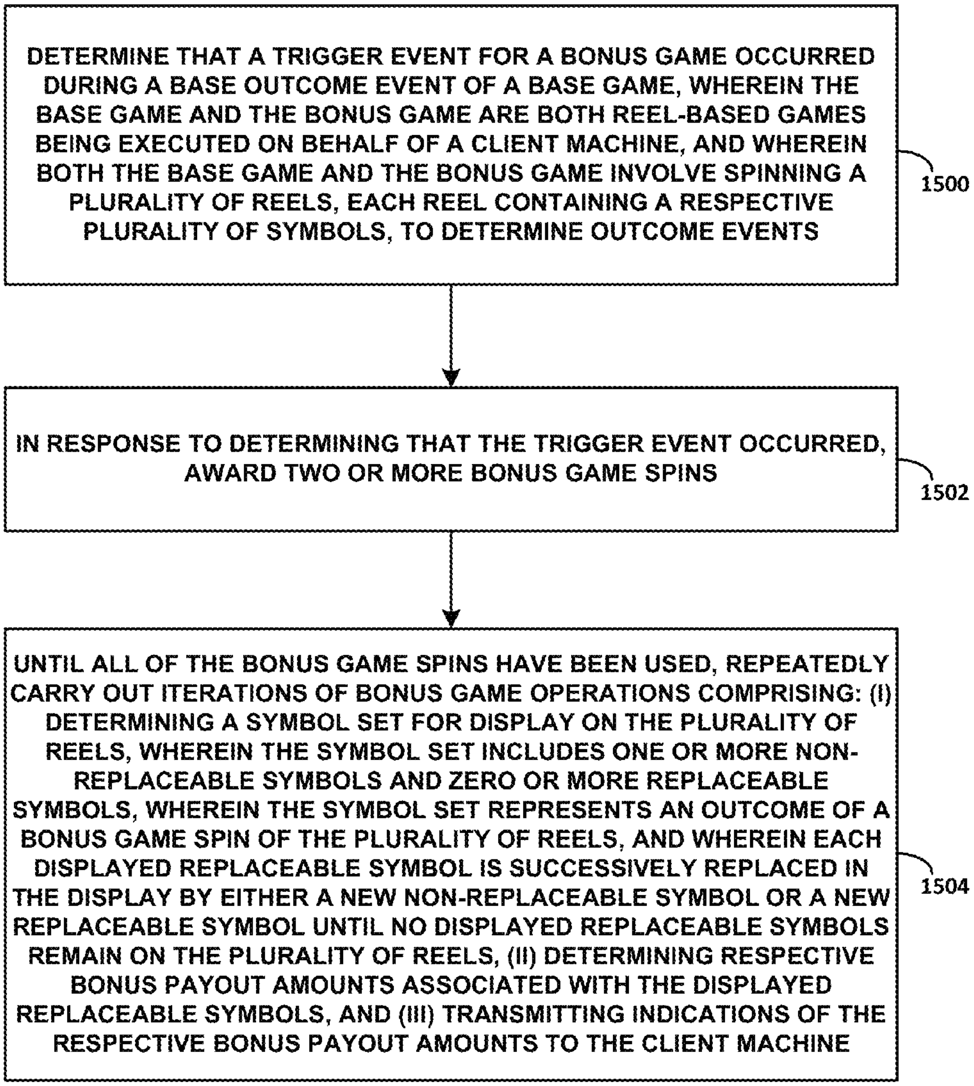
FIG. 15 is yet another flow chart, in accordance with example embodiments.

FIG. 14-15 depict respective flowcharts showing operations that can, for example, be carried out using server machine 100*a*. However, certain aspects of FIG. 14-15 could be carried out by client machine 100*b*. Also, several of the operations described in connection with FIG. 14-15 parallel operations described in connection with FIG. 3A-3D, FIGS. 12A-12E, and FIG. 13A-13C. As such, variations of the operations described in connection with FIG. 3A-3D, FIGS. 12A-12E, and FIG. 13A-13C are likewise applicable to the operations described in connection with FIG. 14-15. However, for the sake of brevity, these variations are not repeated.

At block 1400, it may be determined that a trigger event for a bonus game occurred during a base outcome event of a base game. The base game and the bonus game may both be reel-based games executed on behalf of a client machine. Further, both the base game and the bonus game may involve spinning a plurality of reels, each reel containing a respective plurality of symbols, to determine outcome events.

At block 1402, possibly in response to determining that the trigger event occurred, use of two or more replaceable symbols for the bonus game may be awarded. For example, 5, 10, 15, 20, 25, etc. replaceable symbols may be awarded.

At block 1404, iterations of bonus game operations may be carried out. These iterations may continue until all of the replaceable symbols have been used. Each iteration of the bonus game operations may involve (i) determining a symbol set for display on the plurality of reels, where the symbol set includes one or more non-replaceable symbols and zero or more replaceable symbols, where the symbol set represents an outcome of a bonus game spin of the plurality of reels, and where each displayed replaceable symbol is successively replaced in the display by either a new non-replaceable symbol or a new replaceable symbol until no displayed replaceable symbols remain on the plurality of reels, (ii) determining respective bonus payout amounts associated with the displayed replaceable symbols, and (iii) transmitting indications of the respective bonus payout amounts to the client machine. Determining the symbol set for display on the plurality of reels may involve spinning all of the reels (e.g., simulating a spin of all reels).

In some embodiments, the bonus game operations may further involve transmitting, to the client machine, a representation of one or more of the determined symbol sets. Reception of each transmitted symbol set may cause the client machine to display a spin of the reels resulting in the transmitted symbol set.

In some embodiments, each reel may include a respective cyclical sequence of symbols. Determining the symbol set for display on the plurality of reels may involve, for each reel, randomly selecting a respective reel position that displays a subsequence of the symbols on the reel.

In some embodiments, the trigger event may involve at least three instances of a triggering symbol appearing in a horizontal row across the reels.

In some embodiments, successively replacing each displayed replaceable symbol may involve determining a partial bonus payout associated with each set of replaceable symbols that are simultaneously displayed. Further, transmitting indications of the respective bonus payout amounts to the client machine may involve transmitting indications of each set of simultaneously displayed replaceable symbols and the associated partial bonus payout amounts to the client machine. Additionally, the non-replaceable symbols may include one or more wild symbols. A respective wild bonus payout amount associated with the one or more wild symbols may be determined for each set of replaceable symbols that are simultaneously displayed. Transmitting indications of the respective bonus payout amounts to the client machine may involve transmitting an indication of the respective wild bonus payout amounts to the client machine.

In some embodiments, a particular displayed replaceable symbol may be displayed on a particular reel below one or more particular non-replaceable symbols. Successively replacing each displayed replaceable symbol may involve (i) selecting a new symbol to replace the particular displayed replaceable symbol, (ii) deleting the particular displayed replaceable symbol from the particular reel, (iii) cascading the one or more particular non-replaceable symbols down one symbol position on the particular reel, and (iv) adding and displaying the new symbol in the top row of the particular reel.

In some embodiments, both the base game and the bonus game may have five reels and each of the five reels may display three symbols at a time.

In some embodiments, the bonus game may be associated with a maximum number of bonus game spins of the reels. The iterations of the bonus game operations may be terminated when the maximum number of bonus game spins of the reels is reached.

In some embodiments, the client machine is associated with a credit account. The credit account may be debited to play the base game, credited in response to the triggering event, and credited by each of the respective bonus payout amounts.

In some embodiments, a gaming machine (e.g., server machine 100*a*) may simultaneously execute base games and/or bonus games in real time on behalf of at least 30 client machines. Each of the at least 30 client machines may communicate with the gaming machine by way of a wide-area packet-switched network. In some cases, the gaming machine may simultaneously execute base games and/or bonus games in real time on behalf of more or fewer than 30 client machines. For instance, this simultaneous execution may involve 10, 20, 50, 100, or 1000 client machines, or another extent of client machines.

Particularly, simultaneous execution of such a large number of base games and/or bonus games in real time necessitates computer implementation. When taking part in an online game, such as the reel-based games disclosed herein, players expect results of reel spin or symbol replacement operations to be displayed on their respective client machines in an expeditious fashion (e.g., in real time, such as a few seconds at most per either of these operations). Failure to do so may result in players becoming disinterested in the game. Consequently, the embodiments that include this simultaneous execution a large number of base games and/or bonus games in real time would not exist but for computer implementation thereof.

Further, the embodiments herein specify how interactions between a gaming machine and client machine are manipulated to yield a new result. This result provides a series of bonus game iterations that to players, so that players have further opportunities, and are further incentivized, to interact with the base game. Thus, the intersection of the new features of these embodiments and the computer implementation thereof go beyond conventional and routine operations.

Turning to FIG. 15, at block 1500 it may be determined that a trigger event for a bonus game occurred during a base outcome event of a base game. The base game and the bonus game may both be reel-based games being executed on behalf of a client machine. Further, both the base game and the bonus game may involve spinning a plurality of reels, each reel containing a respective plurality of symbols, to determine outcome events.

At block 1502, possibly in response to determining that the trigger event occurred, two or more bonus game spins may be awarded.

At block 1504, iterations of bonus game operations may be carried out. These iterations may continue until all of the bonus game spins have been used. Each iteration of the bonus game operations may involve (i) determining a symbol set for display on the plurality of reels, where the symbol set includes one or more non-replaceable symbols and zero or more replaceable symbols, where the symbol set represents an outcome of a bonus game spin of the plurality of reels, and where each displayed replaceable symbol is successively replaced in the display by either a new non-replaceable symbol or a new replaceable symbol until no displayed replaceable symbols remain on the plurality of reels, (ii) determining respective bonus payout amounts associated with the displayed replaceable symbols, and (iii) transmitting indications of the respective bonus payout amounts to the client machine.

In some embodiments, the operations in FIGS. 14 and/or 15 may be performed by a gaming system. The gaming system may involve a plurality of gaming devices, each including at least one display device and a plurality of input devices. The input devices may include (i) an acceptor of a physical item associated with a monetary value, (ii) a validator configured to identify the physical item, and (iii) a cash-out button actuatable to cause an initiation of a payout associated with a credit account.

As an example, each gaming device may additionally include one or more gaming device processors, and one or more gaming device memory devices storing a plurality of gaming device instructions executable by the one or more gaming device processors to: determine that a trigger event for a bonus game occurred during a base outcome event of a base game, where the base game and the bonus game are both reel-based games being executed on behalf of a particular gaming device, and where both the base game and the bonus game involve spinning a plurality of reels, each reel containing a respective plurality of symbols, to determine outcome events; in response to determining that the trigger event occurred, award use of two or more replaceable symbols for the bonus game; and until all of the replaceable symbols have been used, repeatedly carry out iterations of bonus game operations involving: (i) determining a symbol set for display on the plurality of reels, where the symbol set includes one or more non-replaceable symbols and zero or more replaceable symbols, where the symbol set represents an outcome of a bonus game spin of the plurality of reels, and where each displayed replaceable symbol is successively replaced in the display by either a new non-replaceable symbol or a new replaceable symbol until no displayed replaceable symbols remain on the plurality of reels, and (ii) determining respective bonus payout amounts associated with the displayed replaceable symbols, and (iii) crediting the respective bonus payout amounts to the credit account.

V. Additional Example Embodiments

The following clauses are offered as further description of the disclosed embodiments.

(1) A method comprising:

determining, by a gaming machine, that a trigger event for a bonus game occurred during a base outcome event of a base game, wherein the base game and the bonus game are both reel-based games being executed on behalf of a client machine, and wherein both the base game and the bonus game involve spinning a plurality of reels, each reel containing a respective plurality of symbols, to determine outcome events;

in response to determining that the trigger event occurred, awarding, by the gaming machine, use of two or more replaceable symbols for the bonus game; and until all of the replaceable symbols have been used, the gaming machine repeatedly carrying out iterations of bonus game operations comprising: (i) determining a symbol set for display on the plurality of reels, wherein the symbol set includes one or more non-replaceable symbols and zero or more replaceable symbols, wherein the symbol set represents an outcome of a bonus game spin of the plurality of reels, and wherein each displayed replaceable symbol is successively replaced in the display by either a new non-replaceable symbol or a new replaceable symbol until no displayed replaceable symbols remain on the plurality of reels, (ii) determining respective bonus payout amounts associated with the displayed replaceable symbols, and (iii) transmitting indications of the respective bonus payout amounts to the client machine.

(2) The method of clause (1), wherein each reel comprises a respective cyclical sequence of symbols, and wherein determining the symbol set for display on the plurality of reels comprises:

for each reel, randomly selecting a respective reel position that displays a subsequence of the symbols on the reel.

(3) The method of any preceding clause, wherein determining the symbol set for display on the plurality of reels comprises simulating a spin of all reels.

(4) The method of any preceding clause, wherein the trigger event comprises at least three instances of a triggering symbol appearing in a horizontal row across the reels.

(5) The method of any preceding clause, wherein successively replacing each displayed replaceable symbol comprises determining a partial bonus payout associated with each set of replaceable symbols that are simultaneously displayed, and wherein transmitting indications of the respective bonus payout amounts to the client machine comprises transmitting indications of each set of simultaneously displayed replaceable symbols and the associated partial bonus payout amounts to the client machine.

(6) The method of clause (5), wherein the non-replaceable symbols include one or more wild symbols, wherein a respective wild bonus payout amount associated with the one or more wild symbols is determined for each set of replaceable symbols that are simultaneously displayed, and wherein transmitting indications of the respective bonus payout amounts to the client machine comprises transmitting an indication of the respective wild bonus payout amounts to the client machine.

(7) The method of any preceding clause, wherein a particular displayed replaceable symbol is displayed on a particular reel below one or more particular non-replaceable symbols, and wherein successively replacing each displayed replaceable symbol comprises:

selecting a new symbol to replace the particular displayed replaceable symbol;

deleting the particular displayed replaceable symbol from the particular reel;

cascading the one or more particular non-replaceable symbols down one symbol position on the particular reel; and adding and displaying the new symbol in the top row of the particular reel.

(8) The method of any preceding clause, wherein both the base game and the bonus game have five reels and each of the five reels displays three symbols at a time.

(9) The method of any preceding clause, wherein the bonus game is associated with a maximum number of bonus game spins of the reels, and wherein the gaming machine terminates the iterations of the bonus game operations when the maximum number of bonus game spins of the reels is reached.

(10) The method of any preceding clause, wherein the client machine is associated with a credit account, and wherein the credit account is debited to play the base game, credited in response to the triggering event, and credited by each of the respective bonus payout amounts.

(11) The method of any preceding clause, wherein the gaming machine simultaneously executes base games or bonus games in real time on behalf of at least 30 client machines, and wherein each of the at least 30 client machines communicates with the gaming machine by way of a wide-area packet-switched network (11a) The method any preceding clause, wherein the bonus game operations further comprise:

transmitting, to the client machine, a representation of one or more of the determined symbol sets, wherein reception of each transmitted symbol set causes the client machine to display a spin of the reels resulting in the transmitted symbol set.

(12) An article of manufacture including a non-transitory computer-readable medium, having stored thereon program instructions that, upon execution by a gaming machine, cause the gaming machine to perform operations comprising:

determining that a trigger event for a bonus game occurred during a base outcome event of a base game, wherein the base game and the bonus game are both reel-based games being executed on behalf of a client machine, and wherein both the base game and the bonus game involve spinning a plurality of reels, each reel containing a respective plurality of symbols, to determine outcome events;

in response to determining that the trigger event occurred, awarding use of two or more replaceable symbols for the bonus game; and until all of the replaceable symbols have been used, repeatedly carrying out iterations of bonus game operations comprising: (i) determining a symbol set for display on the plurality of reels, wherein the symbol set includes one or more non-replaceable symbols and zero or more replaceable symbols, wherein the symbol set represents an outcome of a bonus game spin of the plurality of reels, and wherein each displayed replaceable symbol is successively replaced in the display by either a new non-replaceable symbol or a new replaceable symbol until no displayed replaceable symbols remain on the plurality of reels, (ii) determining respective bonus payout amounts associated with the displayed replaceable symbols, and (iii) transmitting indications of the respective bonus payout amounts to the client machine.

(12a) The article of manufacture of clause (12) combined with aspects of any one or more of clauses (2)-(11a).

(13) The article of manufacture of clause (12), wherein each reel comprises a respective cyclical sequence of symbols, and wherein determining the symbol set for display on the plurality of reels comprises:

for each reel, randomly selecting a respective reel position that displays a subsequence of the symbols on the reel.

(14) The article of manufacture of clause (12) and/or (13), wherein determining the symbol set for display on the plurality of reels comprises simulating a spin of all reels.

(15) The article of manufacture of clause (12), (13), and/or (14), wherein successively replacing each displayed replaceable symbol comprises determining a partial bonus payout associated with each set of replaceable symbols that are simultaneously displayed, and wherein transmitting indications of the respective bonus payout amounts to the client machine comprises transmitting indications of each set of simultaneously displayed replaceable symbols and the associated partial bonus payout amounts to the client machine.

(16) The article of manufacture of clause (12), (13), (14), and/or (15), wherein the non-replaceable symbols include one or more wild symbols, wherein a respective wild bonus payout amount associated with the one or more wild symbols is determined for each set of replaceable symbols that are simultaneously displayed, and wherein transmitting indications of the respective bonus payout amounts to the client machine comprises transmitting an indication of the respective wild bonus payout amounts to the client machine.

(17) The article of manufacture of clause (12), (13), (14), (15), and/or (16), wherein a particular displayed replaceable symbol is displayed on a particular reel below one or more particular non-replaceable symbols, and wherein successively replacing each displayed replaceable symbol comprises:

selecting a new symbol to replace the particular displayed replaceable symbol;

deleting the particular displayed replaceable symbol from the particular reel;

cascading the one or more particular non-replaceable symbols down one symbol position on the particular reel; and adding and displaying the new symbol in the top row of the particular reel.

(18) The article of manufacture of clause (12), (13), (14), (15), (16), and/or (17), wherein the bonus game is associated with a maximum number of bonus game spins of the reels, and wherein the gaming machine terminates the iterations of the bonus game operations when the maximum number of bonus game spins of the reels is reached.

(19) A gaming system comprising:

a plurality of gaming devices each including at least one display device and a plurality of input devices including (i) an acceptor of a physical item associated with a monetary value, (ii) a validator configured to identify the physical item, and (iii) a cash-out button actuatable to cause an initiation of a payout associated with a credit account;

one or more gaming device processors; and one or more gaming device memory devices storing a plurality of gaming device instructions executable by the one or more gaming device processors to:

determine that a trigger event for a bonus game occurred during a base outcome event of a base game, wherein the base game and the bonus game are both reel-based games being executed on behalf of a particular gaming device, and wherein both the base game and the bonus game involve spinning a plurality of reels, each reel containing a respective plurality of symbols, to determine outcome events;

in response to determining that the trigger event occurred, award use of two or more replaceable symbols for the bonus game; and until all of the replaceable symbols have been used, repeatedly carry out iterations of bonus game operations comprising: (i) determining a symbol set for display on the plurality of reels, wherein the symbol set includes one or more non-replaceable symbols and zero or more replaceable symbols, wherein the symbol set represents an outcome of a bonus game spin of the plurality of reels, and wherein each displayed replaceable symbol is successively replaced in the display by either a new non-replaceable symbol or a new replaceable symbol until no displayed replaceable symbols remain on the plurality of reels, and (ii) determining respective bonus payout amounts associated with the displayed replaceable symbols, and (iii) crediting the respective bonus payout amounts to the credit account.

(19a) The gaming system of clause (19) combined with aspects of any one or more of clauses (2)-(11a).

(20) A method comprising:

determining, by a gaming machine, that a trigger event for a bonus game occurred during a base outcome event of a base game, wherein the base game and the bonus game are both reel-based games being executed on behalf of a client machine, and wherein both the base game and the bonus game involve spinning a plurality of reels, each reel containing a respective plurality of symbols, to determine outcome events;

in response to determining that the trigger event occurred, awarding, by the gaming machine, two or more bonus game spins; and until all of the bonus game spins have been used, the gaming machine repeatedly carrying out iterations of bonus game operations comprising: (i) determining a symbol set for display on the plurality of reels, wherein the symbol set includes one or more non-replaceable symbols and zero or more replaceable symbols, wherein the symbol set represents an outcome of a bonus game spin of the plurality of reels, and wherein each displayed replaceable symbol is successively replaced in the display by either a new non-replaceable symbol or a new replaceable symbol until no displayed replaceable symbols remain on the plurality of reels, (ii) determining respective bonus payout amounts associated with the displayed replaceable symbols, and (iii)

transmitting indications of the respective bonus payout amounts to the client machine.

(20a) The method of clause (20) combined with aspects of any one or more of clauses (2)-(11a).

VI. Conclusion

While one or more disclosed operations have been described as being performed by certain entities (e.g., machine 100, server machine 100*a*, or client machine 100*b*), one or more of the operations may be performed by any entity, including but not limited to those described herein. As such, while this disclosure includes examples in which the server machine 100*a* performs select operations and sends data to the client machine 100*b*, such that the client machine 100*b* may perform complementing operations and receive the data, variations may to those operations may be made while adhering to the general server-client dichotomy and the scope of the disclosed machines and methods.

For example, rather than the server machine 100*a* sending select data (e.g., a symbol set) to the client machine 100*b*, such that the client machine may generate and display appropriate images, the server machine 100*a* may itself generate the images and send them to the client machine 100*b* for display. Indeed, it will be appreciated by one of ordinary skill in the art that the "break point" between the server machine's operations and the client machine's operations may be varied with ease.

Further, the described operations throughout this application need not be performed in the disclosed order, although in some examples, the recited order may be preferred. Also, not all operations need to be performed to achieve the desired advantages of disclosed machines and methods, and therefore not all operations are required.

Additionally, any enumeration of elements, blocks, or steps in this specification or the claims is for purposes of clarity. Thus, such enumeration should not be interpreted to require or imply that these elements, blocks, or steps adhere to a particular arrangement or are carried out in a particular order.

While examples have been described in terms of select embodiments, alterations and permutations of these embodiments will be apparent to those of ordinary skill in the art. Other changes, substitutions, and alterations are also possible without departing from the disclosed machines and methods in their broader aspects as set forth in the following claims.

What is claimed is:

1. A method comprising:

determining, by a gaming machine, that a trigger event for a bonus game occurred during a base outcome event of a base game, wherein the base game and the bonus game are both reel-based games being executed on behalf of a client machine with a graphical display unit, wherein both the base game and the bonus game involve graphically displaying, on vertical symbol display segments of the graphical display unit, animations that simulate spinning of a plurality of reels, each reel containing a respective plurality of symbols, subsets of which are displayable in a respective vertical symbol display segment corresponding to the reel, and wherein results of the simulated spinning of the plurality of reels determine outcome events;

in response to determining that the trigger event occurred, determining, by the gaming machine, a number of pre-determined replaceable symbols for the bonus game, wherein each of the replaceable symbols, when displayed, indicates a playing card rank, and wherein the replaceable symbols are distinct from non-replaceable symbols used in the bonus game;

adding the number of the replaceable symbols to the plurality of reels; and until all of the replaceable symbols have been replaced by non-replaceable symbols, the gaming machine repeatedly carrying out iterations of bonus game operations comprising:

(i) determining a symbol set for display on the vertical symbol display segments, wherein the determined symbol set includes one or more of the non-replaceable symbols and zero or more of the replaceable symbols, and wherein the determined symbol set represents an outcome of a bonus game spin of the plurality of reels, (ii) causing the graphical display unit to display an animation that simulates a spinning of the reels, wherein the spinning of the reels results in the vertical symbol display segments displaying the determined symbol set, (iii) causing the graphical display unit to display successive replacement of each displayed replaceable symbol in the determined symbol set with either a new non-replaceable symbol or a new replaceable symbol until no displayed replaceable symbols remain on the vertical symbol display segments, wherein a particular displayed replaceable symbol is displayed on a particular vertical symbol display segment below one or more particular non-replaceable symbols, and wherein successive replacement of each displayed replaceable symbol in the particular vertical symbol display segment comprises:

(a) selecting a new symbol to replace the particular displayed replaceable symbol, (b) determining a bonus payout amount associated with the particular displayed replaceable symbol, (c) causing the graphical display unit to display an indication of the bonus payout amount by visually transforming the particular displayed replaceable symbol into a representation of the bonus payout amount, (d) deleting the particular displayed replaceable symbol from the particular vertical symbol display segment, (e) sliding the one or more particular non-replaceable symbols down one symbol position on the particular vertical symbol display segment, and (f) Placing the new symbol at the top of the particular vertical symbol display segment.

2. The method of claim 1, wherein each reel comprises a respective cyclical sequence of symbols, and wherein determining the symbol set for display on the vertical symbol display segments comprises:

for each reel, randomly selecting a respective reel position that displays a subsequence of the symbols in the associated vertical symbol display segment.

3. The method of claim 1, wherein the trigger event comprises at least three instances of a triggering symbol appearing in a horizontal row across the vertical symbol display segments.

4. The method of claim 1, wherein the non-replaceable symbols include one or more wild symbols, wherein a respective wild bonus payout amount associated with the one or more wild symbols is determined for each set of replaceable symbols that are displayed, and wherein causing the graphical display unit to display indications of the respective bonus payout amounts comprises causing the graphical display unit to display an indication of the respective wild bonus payout amounts.

5. The method of claim 1, wherein both the base game and the bonus game have five reels respectively associated with five vertical symbol display segments and each of the associated five vertical symbol display segments displays three symbols at a time.

6. The method of claim 1, wherein the bonus game is associated with a maximum number of bonus game spins of the reels, and wherein the gaming machine also terminates the iterations of the bonus game operations when the maximum number of bonus game spins of the reels is reached.

7. The method of claim 1, wherein the client machine is associated with a credit account, and wherein the credit account is debited to play the base game, credited in response to the triggering event, and credited by each of the respective bonus payout amounts.

8. The method of claim 1, wherein the gaming machine simultaneously executes base games or bonus games in real time on behalf of at least 30 client machines, and wherein each of the at least 30 client machines communicates with the gaming machine by way of a wide-area packet-switched network.

9. An article of manufacture including a non-transitory computer-readable medium, having stored thereon program instructions that, upon execution by a gaming machine, cause the gaming machine to perform operations comprising:

determining that a trigger event for a bonus game occurred during a base outcome event of a base game, wherein the base game and the bonus game are both reel-based games being executed on behalf of a client machine with a graphical display unit, wherein both the base game and the bonus game involve graphically displaying, on vertical symbol display segments of the graphical display unit, animations that simulate spinning of a plurality of reels, each reel containing a respective plurality of symbols, subsets of which are displayable in a respective vertical symbol display segment corresponding to the reel, and wherein results of the simulated spinning of the plurality of reels determine outcome events;

in response to determining that the trigger event occurred, determining a number of pre-determined replaceable symbols for the bonus game, wherein each of the replaceable symbols, when displayed, indicates a playing card rank, and wherein the replaceable symbols are distinct from non-replaceable symbols used in the bonus game;

adding the number of the replaceable symbols to the plurality of reels; and until all of the replaceable symbols have been replaced by non-replaceable symbols, repeatedly carrying out iterations of bonus game operations comprising:

(i) determining a symbol set for display on the vertical symbol display segments, wherein the determined symbol set includes one or more of the non-replaceable symbols and zero or more of the replaceable symbols, and wherein the determined symbol set represents an outcome of a bonus game spin of the plurality of reels, (ii) causing the graphical display unit to display an animation that simulates a spinning of the reels, wherein the spinning of the reels results in the vertical symbol display segments displaying the determined symbol set, (iii) causing the graphical display unit to display successive replacement of each displayed replaceable symbol in the determined symbol set with either a new non-replaceable symbol or a new replaceable symbol until no displayed replaceable symbols remain on the vertical symbol display segments, wherein a particular displayed replaceable symbol is displayed on a particular vertical symbol display segment below one or more particular non-replaceable symbols, and wherein successive replacement of each displayed replaceable symbol in the particular vertical symbol display segment comprises:

(a) selecting a new symbol to replace the particular displayed replaceable symbol, (b) determining a bonus payout amount associated with the particular displayed replaceable symbol, (c) causing the graphical display unit to display an indication of the bonus payout amount by visually transforming the particular displayed replaceable symbol into a representation of the bonus payout amount, (d) deleting the particular displayed replaceable symbol from the particular vertical symbol display segment, (e) sliding the one or more particular non-replaceable symbols down one symbol position on the particular vertical symbol display segment, and (f) Placing the new symbol at the top of the particular vertical symbol display segment.

10. The article of manufacture of claim 9, wherein each reel comprises a respective cyclical sequence of symbols, and wherein determining the symbol set for display on the vertical symbol display segments comprises:

for each reel, randomly selecting a respective reel position that displays a subsequence of the symbols in the associated vertical symbol display segment.

11. The article of manufacture of claim 9, wherein the non-replaceable symbols include one or more wild symbols, wherein a respective wild bonus payout amount associated with the one or more wild symbols is determined for each set of replaceable symbols that are displayed, and wherein causing the graphical display unit to display indications of the respective bonus payout amounts comprises causing the graphical display unit to display an indication of the respective wild bonus payout amounts.

12. The article of manufacture of claim 9, wherein the bonus game is associated with a maximum number of bonus game spins of the reels, and wherein the gaming machine also terminates the iterations of the bonus game operations when the maximum number of bonus game spins of the reels is reached.

13. A gaming system comprising:

a plurality of gaming devices each including at least one display device and a plurality of input devices including (i) an acceptor of a physical item associated with a monetary value, (ii) a validator configured to identify the physical item, and (iii) a cash-out button actuatable to cause an initiation of a payout associated with a credit account;

one or more gaming device processors; and one or more gaming device memory devices storing a plurality of gaming device instructions executable by the one or more gaming device processors to:

determine that a trigger event for a bonus game occurred during a base outcome event of a base game, wherein the base game and the bonus game are both reel-based games being executed on behalf of a particular gaming device with a graphical display unit, wherein both the base game and the bonus game involve graphically displaying, on vertical symbol display segments of the graphical display unit, animations that simulate spinning a plurality of reels, each reel containing a respective plurality of symbols, subsets of which are displayable in a respective vertical symbol display segment corresponding to the reel, and wherein results of the simulated spinning of the plurality of reels to determine outcome events;

in response to determining that the trigger event occurred, determine a number of pre-determined replaceable symbols for the bonus game, wherein each of the replaceable symbols, when displayed, indicates a playing card rank, and wherein the replaceable symbols are distinct from non-replaceable symbols used in the bonus game;

add the number of the replaceable symbols to the plurality of reels; and until all of the replaceable symbols have been replaced by non-replaceable symbols, repeatedly carry out iterations of bonus game operations comprising:

(i) determining a symbol set for display on the vertical symbol display segments, wherein the determined symbol set includes one or more of the non-replaceable symbols and zero or more of the replaceable symbols, and wherein the determined symbol set represents an outcome of a bonus game spin of the plurality of reels, (ii) causing the graphical display unit to display an animation that simulates a spinning of the reels, wherein the spinning of the reels results in the vertical symbol display segments displaying the determined symbol set, (iii) causing the graphical display unit to display successive replacement of each displayed replaceable symbol in the determined symbol set with either a new non-replaceable symbol or a new replaceable symbol until no displayed replaceable symbols remain on the vertical symbol display segments, wherein a particular displayed replaceable symbol is displayed on a particular vertical symbol display segment below one or more particular non-replaceable symbols, and wherein successive replacement of each displayed replaceable symbol in the particular vertical symbol display segment comprises:

(a) selecting a new symbol to replace the particular displayed replaceable symbol, (b) determining a bonus payout amount associated with the particular displayed replaceable symbol, (c) causing the graphical display unit to display an indication of the bonus payout amount by visually transforming the particular displayed replaceable symbol into a representation of the bonus payout amount, (d) deleting the particular displayed replaceable symbol from the particular vertical symbol display segment, (e) sliding the one or more particular non-replaceable symbols down one symbol position on the particular vertical symbol display segment, and (f) Placing the new symbol at the top of the particular vertical symbol display segment.

* * * * *